United States Patent [19]

Prather

[11] Patent Number: 5,251,157
[45] Date of Patent: Oct. 5, 1993

[54] PROCESS FOR OFFSET ADJUSTMENT OF A MICROPROCESSOR BASED OVERCURRENT PROTECTIVE DEVICE AND APPARATUS

[75] Inventor: Edward C. Prather, Hendersonville, N.C.

[73] Assignee: Westinghouse Electric Corp., Pittsburgh, Pa.

[21] Appl. No.: 636,870

[22] Filed: Dec. 28, 1990

[51] Int. Cl.$^5$ .................... G06F 15/56; G01R 35/00
[52] U.S. Cl. .................... 364/571.04; 364/492; 364/571.01
[58] Field of Search .................... 364/571.01–571.08, 364/481, 483, 492; 371/15.1, 16.4

[56] References Cited

U.S. PATENT DOCUMENTS

| | | |
|---|---|---|
| 3,323,034 | 5/1967 | Dubin et al. |
| 3,754,182 | 8/1973 | Morris et al. |
| 3,925,709 | 12/1975 | Mitchell et al. |
| 4,114,048 | 9/1978 | Hall et al. |
| 4,131,935 | 12/1978 | Clement |
| 4,166,205 | 8/1979 | Maier et al. ............ 200/153 |
| 4,245,184 | 1/1981 | Billings et al. |
| 4,251,743 | 2/1981 | Hareyama |
| 4,316,136 | 2/1982 | Saxarra et al. |
| 4,321,583 | 3/1982 | Baron et al. |
| 4,331,997 | 5/1982 | Engel et al. ............ 361/93 |
| 4,366,469 | 12/1982 | Michaels |
| 4,384,321 | 5/1983 | Rippel |
| 4,399,416 | 8/1983 | Gillespie |
| 4,467,260 | 8/1984 | Mallick, Jr. et al. ............ 318/800 |
| 4,471,418 | 9/1984 | Tuma |
| 4,503,408 | 3/1985 | Mrenna et al. ............ 335/135 |
| 4,550,360 | 10/1985 | Dougherty ............ 361/93 |
| 4,554,501 | 11/1985 | Baker |
| 4,556,838 | 12/1985 | Brasseur |
| 4,577,279 | 3/1986 | Salowe ............ 364/572 X |
| 4,618,848 | 10/1986 | Parfitt |
| 4,626,831 | 12/1986 | Engel |

(List continued on next page.)

OTHER PUBLICATIONS

Great Britain App. Serial #GB-A-2155266 (U.S. Counterpart 4546403).
PCT App. Ser. #WO-A-8701765 (U.S. Counterpart 4680667).
"Interrupt-Driven Microprocessor-Based Overcurrent Relay" by M. A. Manzoul, IEEE Transactions on Industrial Electronics, vol. 38, No. 1, pp. 8–9, Feb. '91.
"Rule-Based Coordination Program Evaluates Distribution Overcurrent Protection Alternatives" by S. R. Mendis, M. T. Bishop and D. A. Gonzalez, IEEE Computer Applications in Power, pp. 31–36, Apr. '91.
"Monolithic Sensor Interfaces With On-Board Digital Signal Processing", Sharbel E. Novjaim, Proceedings of the American Control.
"How To Select A Microcontroller", John J. Vaglica and Peter S. Gilmour, IEEE Spectrum Magazine, Nov. 1990.
"Using The Motorola MC68HC11", Steve Garcia and Burton Brown, Circuit Cellar Ink Magazine, Dec. 1990, Jan. 1991.
Westinghouse Descriptive Bulletin 8171 "IQ Data" Mar. 1990.

Primary Examiner—Kevin J. Teska
Attorney, Agent, or Firm—M. J. Moran

[57] ABSTRACT

Process and apparatus for calibrating an electrical device such as a circuit breaker, motor controller or monitor is taught. A precision power supply device is interconnected by way of appropriate input channels to the device to be calibrated for supplying a precise accurate calibration variable as an input. A personal computer is interlinked by way of a communications network with the apparatus to be calibrated and is also interlinked with the precision supply device so that the personal computer has available the exact value of input variable utilized.

9 Claims, 16 Drawing Sheets

U.S. PATENT DOCUMENTS

| | | |
|---|---|---|
| 4,642,636 | 2/1987 | Smith et al. ............... 364/571.01 X |
| 4,644,566 | 2/1987 | Vercellotti et al. . |
| 4,669,052 | 5/1987 | Bianco ........................ 364/571.04 |
| 4,677,366 | 6/1987 | Wilkinson et al. . |
| 4,683,415 | 7/1987 | Zimmerman . |
| 4,698,740 | 10/1987 | Rodgers et al. . |
| 4,712,169 | 12/1987 | Albach . |
| 4,716,536 | 12/1987 | Blanchard ................... 364/571.04 |
| 4,731,722 | 3/1988 | Conroy . |
| 4,746,899 | 5/1988 | Swanson et al. . |
| 4,800,513 | 1/1989 | Deutsch ...................... 364/571.02 |
| 4,812,736 | 3/1989 | Albach et al. . |
| 4,831,378 | 5/1989 | Baars et al. . |
| 4,837,504 | 6/1989 | Baer et al. .................. 364/571.04 X |
| 4,839,819 | 6/1989 | Begin et al. ................ 364/571.01 X |
| 4,845,649 | 7/1989 | Eckardt et al. .............. 364/571.02 |
| 4,851,843 | 7/1989 | Neal . |
| 4,864,213 | 9/1989 | Kido . |
| 4,870,418 | 9/1989 | Kal et al. . |
| 4,876,502 | 10/1989 | Verbanets et al. . |
| 4,893,102 | 1/1990 | Bauer .......................... 335/132 |
| 4,903,023 | 2/1990 | Evans et al. ................. 364/571.05 X |
| 4,910,631 | 3/1990 | Murphy . |
| 4,937,764 | 6/1990 | Komatsu et al. ............ 364/571.01 X |
| 4,940,929 | 7/1990 | Williams . |
| 4,940,981 | 7/1990 | Naylor et al. . |
| 4,942,509 | 7/1990 | Shires et al. . |
| 4,959,809 | 9/1990 | Rogers et al. ............... 364/571.01 X |
| 4,964,029 | 10/1990 | Severinsky et al. . |
| 5,003,454 | 3/1991 | Bruning . |
| 5,006,975 | 4/1991 | Neufeld . |
| 5,018,087 | 5/1991 | Dannenberg ................ 364/571.08 X |

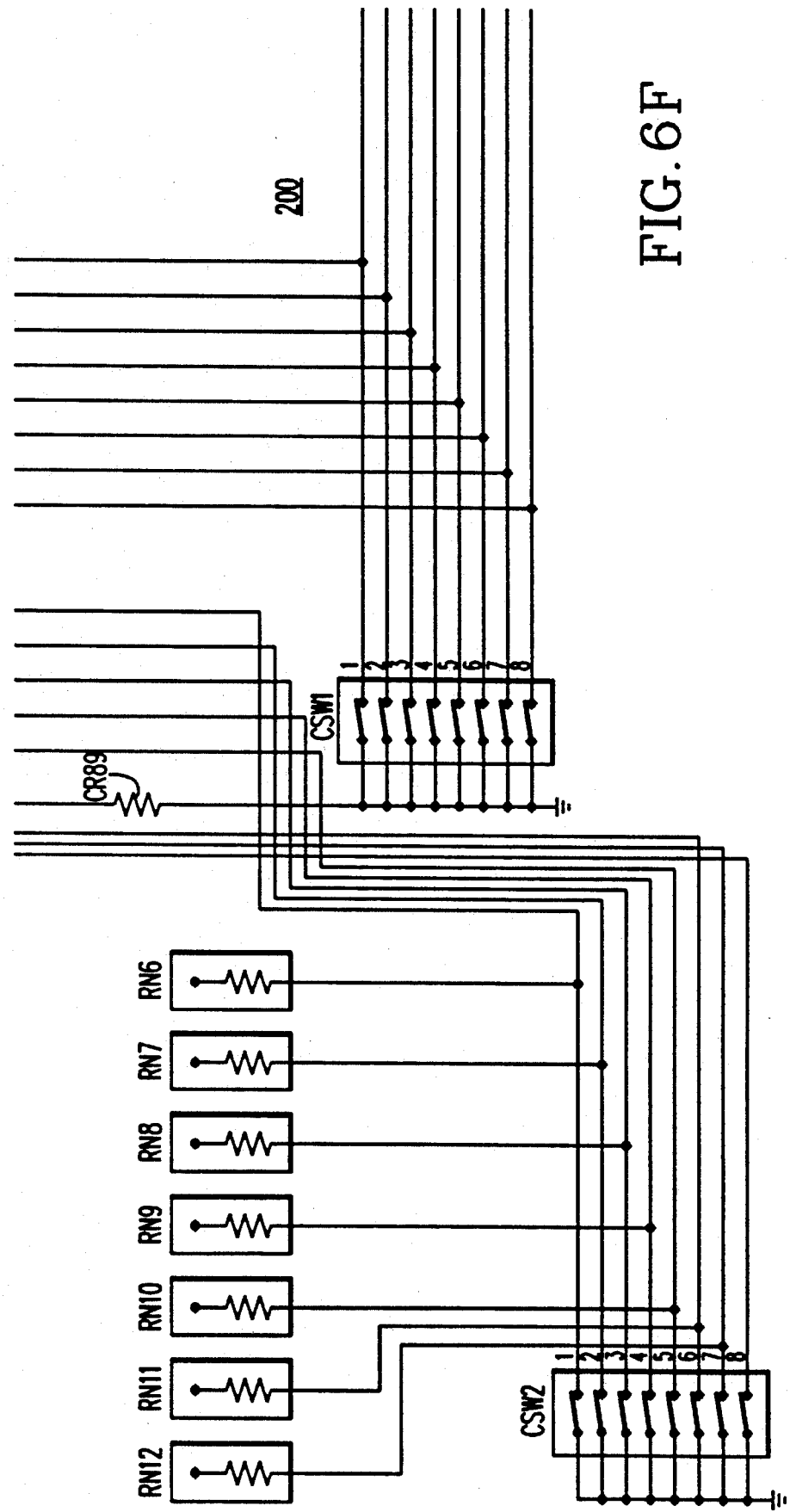

PROCESS FOR OFFSET ADJUSTMENT OF A MICROPROCESSOR BASED OVERCURRENT PROTECTIVE DEVICE AND APPARATUS

CROSS REFERENCE TO RELATED APPLICATIONS

The subject matter of this invention is related to subject matter disclosed and claimed in the following concurrently filed copending applications:

U.S. application Ser. No. 636,643, entitled "SURE-CHIP", by J. C. Schlotterer.

U.S. application Ser. No. 636,000, entitled "A Process for Auto Calibration of a Microprocessor Based Overcurrent Protective Device and Apparatus", by Joseph C. Engel, Gary F. Saletta, Marlan L. Winter, Edward C. Prather.

U.S. application Ser. No. 635,720, entitled "Voltage Controlled Power Supply", by Marlan L. Winter and Mark E Innes.

BACKGROUND OF THE INVENTION

Various electrical apparatus such as circuit breakers, motor controllers, monitors, motor starters and similar apparatus have many common features. Basically, these apparatus rely upon sensing electrical variables such as line to neutral voltage, line-to-line voltage, phase current, frequency and the like as inputs, either alone or in combination, for ultimately causing a desirable electrical function to occur. For instance circuit breakers sense the current and open upon the occurrence of the predetermined amount of overload current. Motor controllers are utilized to start motors to relay information about the status of one motor from one station to another, etc. Monitors provide readout information about the status of line currents and voltages, power frequency, etc. The state of the art has advanced to a position where the aforementioned provide current voltage, power frequency information, etc. to a printed circuit card which may have surface mounted components, discrete components, transformers, inductors, capacitors, operational amplifiers and all of the appropriate interconnecting paths as well as computer devices such as communication networks, A to D converters, counters, etc. In many applications, microprocessors having random access memories (RAM) and electrically erasable programmable read only memories (EEPROM). Part or all of these devices may be contained in large scale integrated circuits or combinations of large scale integrated circuits or discrete components. Many of the aforementioned contained potentiometer devices such as three-point or two-point variable resistors, variable capacitors, adjustable operational amplifiers, etc.

It has long been recognized that in order for any of the devices or apparatus described previously to operate reliably and accurately, it is necessary for the sensing transformers, internal circuit board components, large scale integrated circuits, etc. to accurately depict both within the basic circuitry and at the output devices such as readout devices, circuit breaker tripping devices, relaying devices, those variables which are monitored or read. For instances, the circuit breaker is programmed to trip within a specific period of time at 10 amperes, for example, and if in fact 10 amperes is the amount of current flowing in the line to be protected but the gain adjustment and offset factors and conditions within the circuitry indicate that only 9.9 amperes are being read, then an error exists which in some instances could lead to catastrophic consequences. In the past, provision has been made for eliminating the error by placing the device in question in a test mode whereby a precision value of a desired variable is provided as a sensed input to the system and various potentiometers, offset adjustment devices and the like are manipulated or "tweaked" at the end of the production process so that desirable occurrences happen at the exact value of input variable at which they are supposed to happen. Generally, after this has been completed, a protective coating of material is placed over the adjustment features so that they may not be tampered with by subsequent purchasers, users, etc. One can see that this leads to a number of disadvantages or problems. One disadvantage lies in the fact that the process immediately described as highly labor intensive and furthermore requires a great deal of judgement, experience and perhaps even dexterity on the part of the calibrator or adjustor. Furthermore, in some instances where a microprocessor is employed, a resistive capacitive network rather than a crystal oscillator may be utilized for determining a microprocessor's time base. In sensitive applications, this time base accuracy may not be sufficient. In addition, problems can arise if the "board" to be calibrated is small or has been conformal coated.

Two areas in which calibration problems are likely to arise are associated with analog sampling systems that require both gain and offset. Gain adjustments are required for precision circuits requiring operational amplifiers to magnify or attenuate a signal before being processed by an analog-to-digital converter. Offset adjustments are made to remove errors caused by DC biasing currents existing in a circuit. Those offsets could be present on the input signals or generated by operational amplifiers in the circuit. Gain adjustment is usually made by imposing a multiplying factor on a signal whereas offset adjustment is made by adding or subtracting a constant to or from the signal being processed.

U.S. Pat. No. 4,550,360 issued on Oct. 29, 1985 to J. J. Dougherty entitled "Circuit Breaker Static Trip Unit Having Automatic Circuit Trimming" teaches one way to overcome problems associated with the prior art.

The Dougherty patent describes the use of a microprocessor and selected input values to correct for gain and offset. However, emphasis is directed to correction for individual components or a class thereof within the system. It requires testing individual components or classes of individual components using different inputs such as, for example, full scale current for current transformers and five milliamperes for a diode and then deriving a microprocessor memory correction value related thereto.

However, it would be advantageous to be able to calibrate the entire system using only a single input where the calibration is related to the ultimate output value rather than to the individual values of components. It would be further advantageous to be able to achieve the foregoing without adding extra component elements to the system being calibrated and to do the calibration in a non obtrusive manner.

It can be seen, therefore, that the present mode for calibration has many disadvantages as described previously. It would be desirous therefore if an advantageous calibration procedure on apparatus could be found which was relatively inexpensive, required a minimum of human intervention, was highly accurate, highly reliable and as close to being automated as possible.

SUMMARY OF THE INVENTION

In accordance with the invention, a process for calculating a digital offset coefficient for an electrical device of the type that acts in the presence of a predetermined value of an input electrical variable of an input of the electrical device to perform an ultimate function as claimed. The offset coefficient is digitally stored in an offset coefficient memory region of the electrical device. Any input electrical value within a range of input electrical values provides a corresponding derived electrical value in the device. The process comprises the steps of supplying a first value of the input electrical variable to the input where the first value is defined as being equal to zero. That value is sensed and a corresponding first derived value related thereto is generated. That first derived value is the offset coefficient. The next step is one of communicating that offset coefficient to the offset coefficient memory region for digital placement therein and subsequent use by the electrical device in performing the function The function is performed when any derived value is affected by the offset coefficient equals the predetermined value.

In addition, an electrical device of the type that acts in the presence of a predetermined value of an input electrical variable is also claimed which includes construction features which perform the steps described previously with respect to the process claimed.

BRIEF DESCRIPTION OF THE DRAWINGS

For a better understanding of the invention, reference may be had to the preferred embodiment, therefore, shown in the accompanying drawings in which FIGS. 6A-6H shows a schematic diagram partially in block diagram form of the electrical circuitry which embodies the teachings of the present invention.

DESCRIPTION OF THE PREFERRED EMBODIMENT

Figure 1:
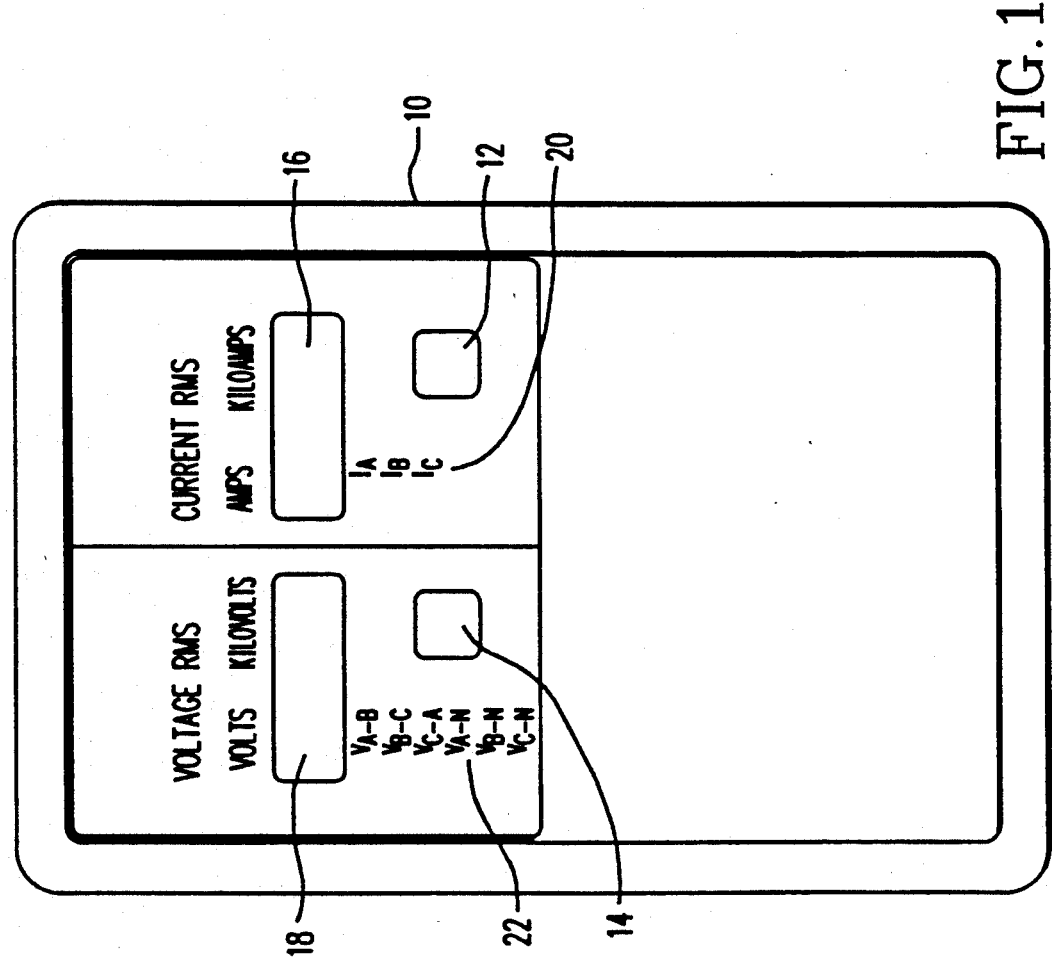
FIG. 1 shows a front elevation of apparatus which embodies the teachings of the present invention.

Referring now to the drawings and FIG. 1, in particular, there is shown a digital metering device 10 otherwise known as the Westinghouse IQ Data which utilizes the teachings of the present invention. The IQ DATA is a microprocessor based monitoring device that provides simultaneous current and voltage metering Stepping control switches 12 and 14 jog or index through metered current or voltage values as depicted at readout portions 16 and 18, respectively That particular current or voltage being read at any one instant of time on the readout portion 16 and 18 are indicated by the appropriate illumination of light emitting diodes in index regions 20 and 22, respectively.

Figure 2:
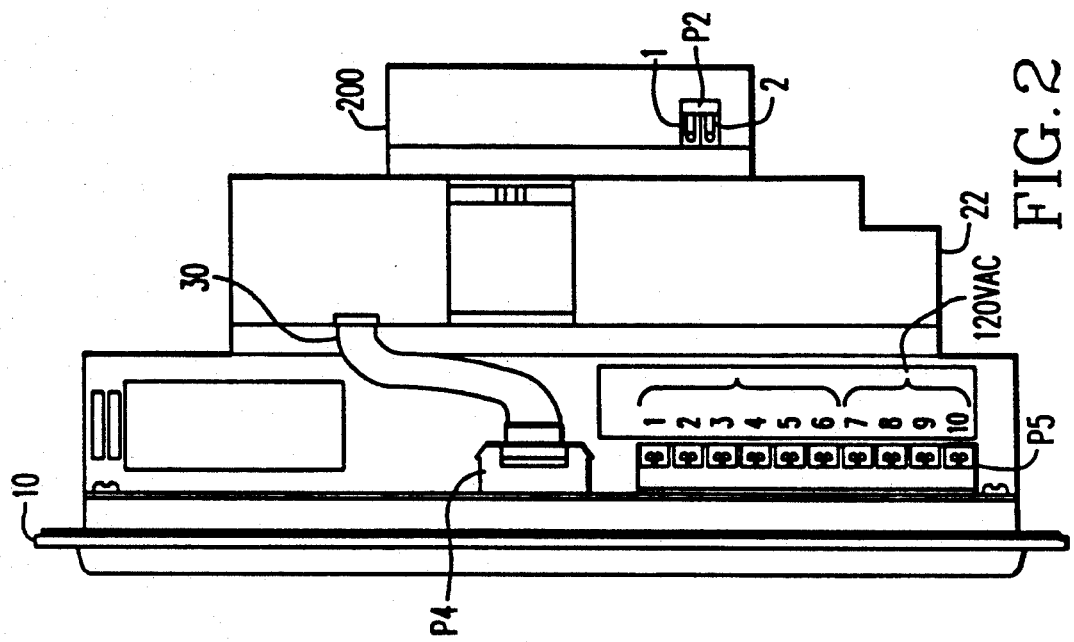
FIG. 2 shows a left elevation of that which is shown in FIG. 1.
Figure 3:
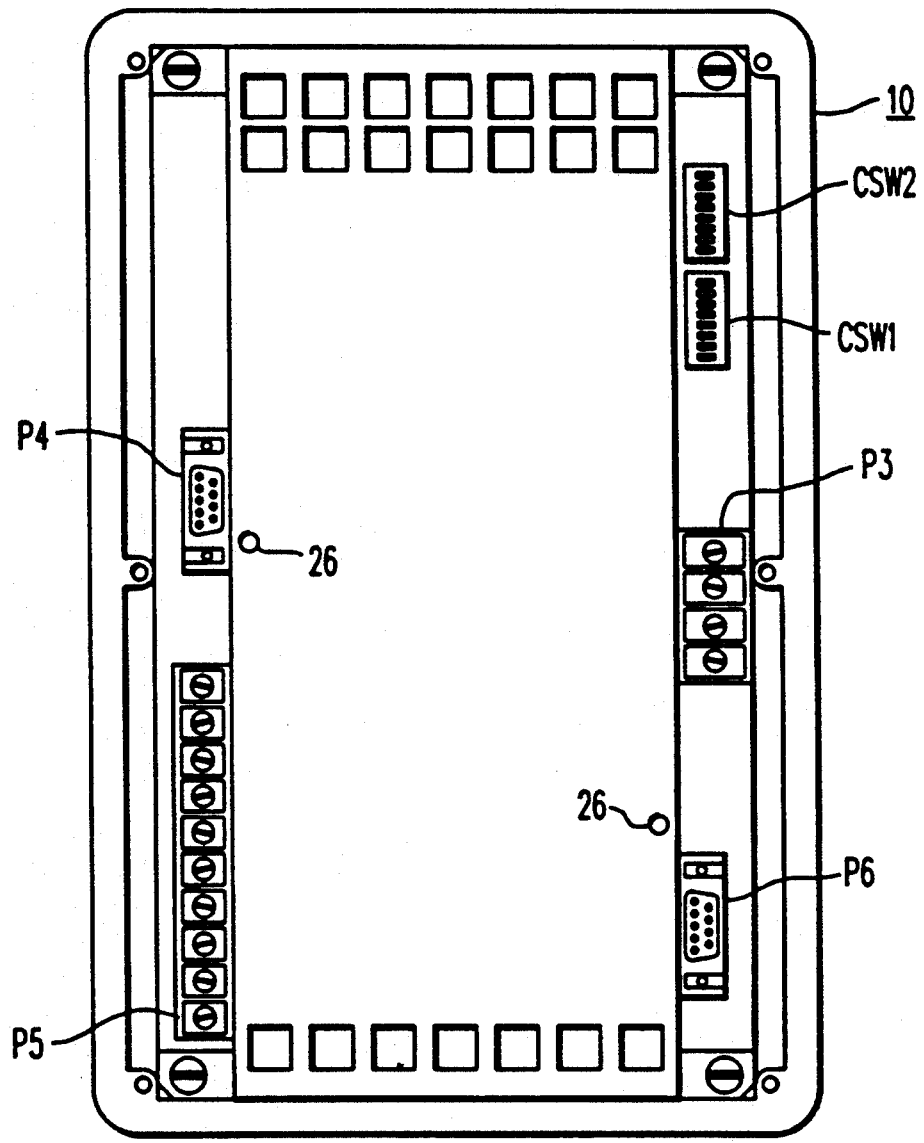
FIG. 3 shows a rear elevation of that which is shown in FIG. 1 with some features deleted for the purpose of clarity.

Referring to FIGS. 2 and 3, side and back views of the IQ DATA 10 are shown, respectively. In FIG. 2 separate power module 22 and communication module 200 are shown "piggybacked" onto the monitor 10. The latter modules 22 and 200 are removed for purposes of clarity of illustration in FIG. 3, although the threaded mounting holes 26 therefor are shown. There are shown on the backpane field selectable switches CSW1 and CSW2, the purpose of which will be described hereinafter, three-phase ac voltage line connector with ground at terminal block P3. A communications option connector at terminal block P6, a voltage power module option connector at terminal block P4 and connections for current transformers and a separate power supply at terminal block P5. In a preferred embodiment of the invention, separate power module 22 is interconnected with the monitor 10 by way of cable 30 and connector P4. Likewise, communications module 200 is interconnected with the monitor 10 at the communications option connector P6 by way of a cable (not shown). There is also a communications input at connector P2 where an "INCOM network" or a personal computer may be interconnected.

Figure 5:
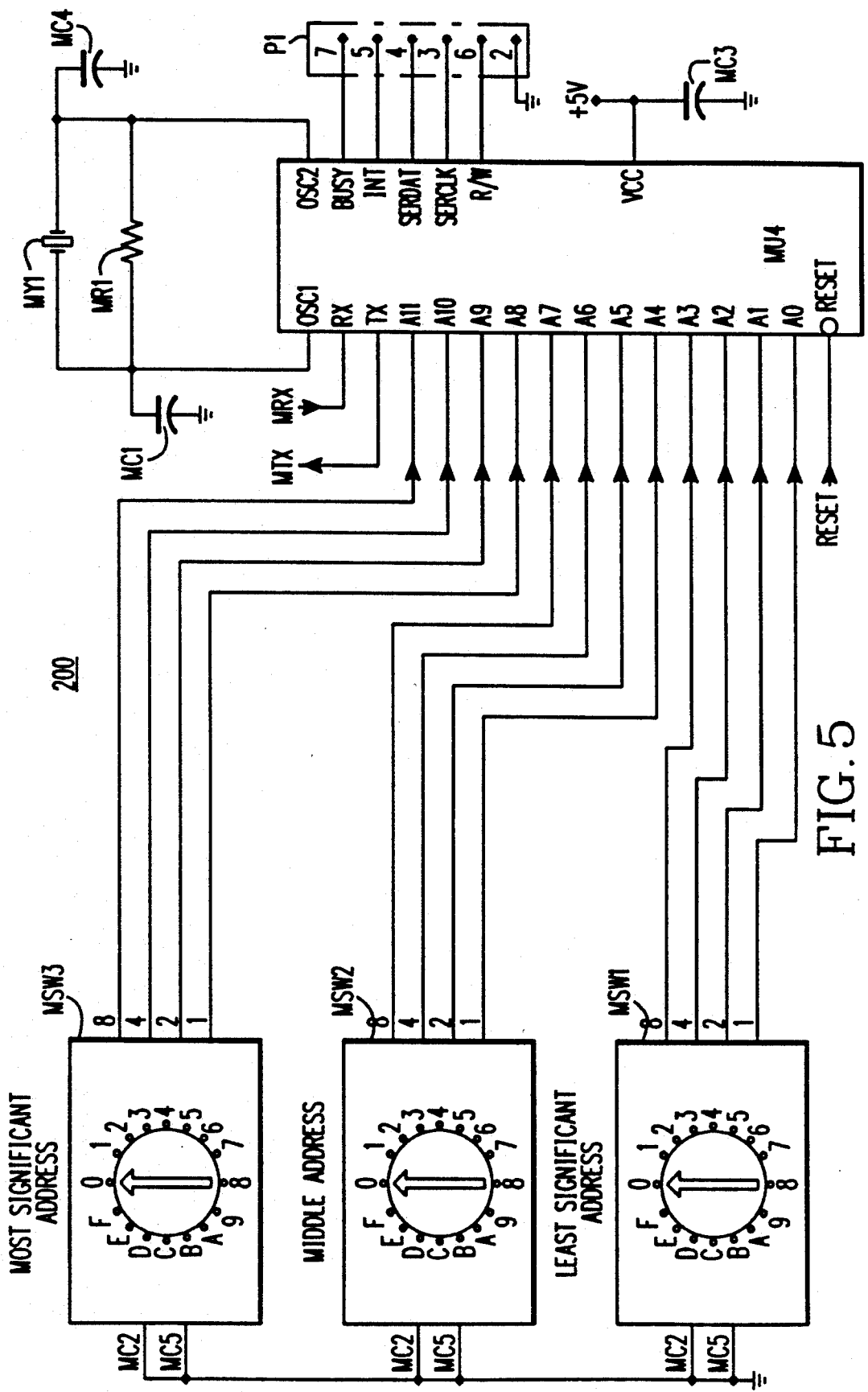
FIG. 5 shows a schematic diagram of another part of the communication or monitor portion of the apparatus shown in FIG. 2.

Referring now to FIGS. 2 and 5, there is shown circuit schematic diagram, for the communication module 200. The communication module 200 which may be otherwise known as a smart minicomputer or PONI "Product Operated Network Interface" may act as an interface device between a remote personal computer PC and the electrical monitor 10. In this embodiment of the invention there are provided three rotary switches MSW1, MSW2, MSW3 representing the least significant address, the middle address, and the most significant address, respectively, for external access to the device 10 from a data highway, for example. Inputs MC2, MC5 of each of the aforementioned switches are grounded. The hexadecimal outputs "1", "2", "4", "8" for each switch, respectively, are provided to INCOM communication chip MU4 the INCOM chip is proprietary to the in U.S. Pat. No. 4,644,547, issued Feb. 17, 1987 to L. C. Vercellotti et al. and entitled, "Digital Message Format for Two-Way Communication and Control Network". U.S. Pat. No. 4,644,547 is incorporated by reference herein. In this embodiment of the invention, INCOM chip MU4 operates in the expanded mode slave configuration. For the output of switch MSW1, the "1" output is provided to the A0 input of the chip MU4. The "2" output is provided to the A1 input, the "4" is provided to the A2 input, and the "8" is provided to the A3 input. In a like manner, for switch MSW2 the "1", "2", "4", "8" outputs are provided to the A4, A5, A6, A7 inputs of the chip MU4. Finally, for the switch MSW3 the "1", "2", "4", "8" outputs are provided to the A8, A9, A10, A11 inputs, respectively, of the chip MU4. The RX input and TX output of the communication chip MU4 are connected with complementary inputs and outputs of other portions of the communication module 200 in a manner which will be described hereinafter. Signal MRX is provided to the RX input and signal MTX comes from the T output. There is provided a capacitor element MC1 one side of which is grounded and the other side of which is connected to the OSC1 input of the chip MU4, one side of a crystal MY1, and one side of a resistive element MR1. The other side of the crystal MY1 and the other side of the resistive element MR1 are connected to the OSC2 input of the communication chip MU4 and one side of a capacitive element MC4, the other side of which is grounded The crystal MY1 may, in one embodiment of the invention, be a 3.6864 MHz crystal. The BUSY output of the communication chip MU4 is connected to Pin 7 of connector Pl. The INT output of the communication chip MU4 is connected to Pin 5 of connector P1. The SERDAT terminal of the communication chip MU4 is connected to Pin 4 of connector Pl. The SCRCLK terminal of the communication chip MU4 is connected to Pin 3 of connector Pl and the R/W terminal of the communication chip MU4 is connected to Pin 6 of connector Pl. The VDD terminal of the communications chip MU4 is connected to a +5 V power supply for power and to one side of capacitive element MC3. The other side of the capacitive element MC3 is connected to ground.

INPUT NETWORK 201

Figure 4:
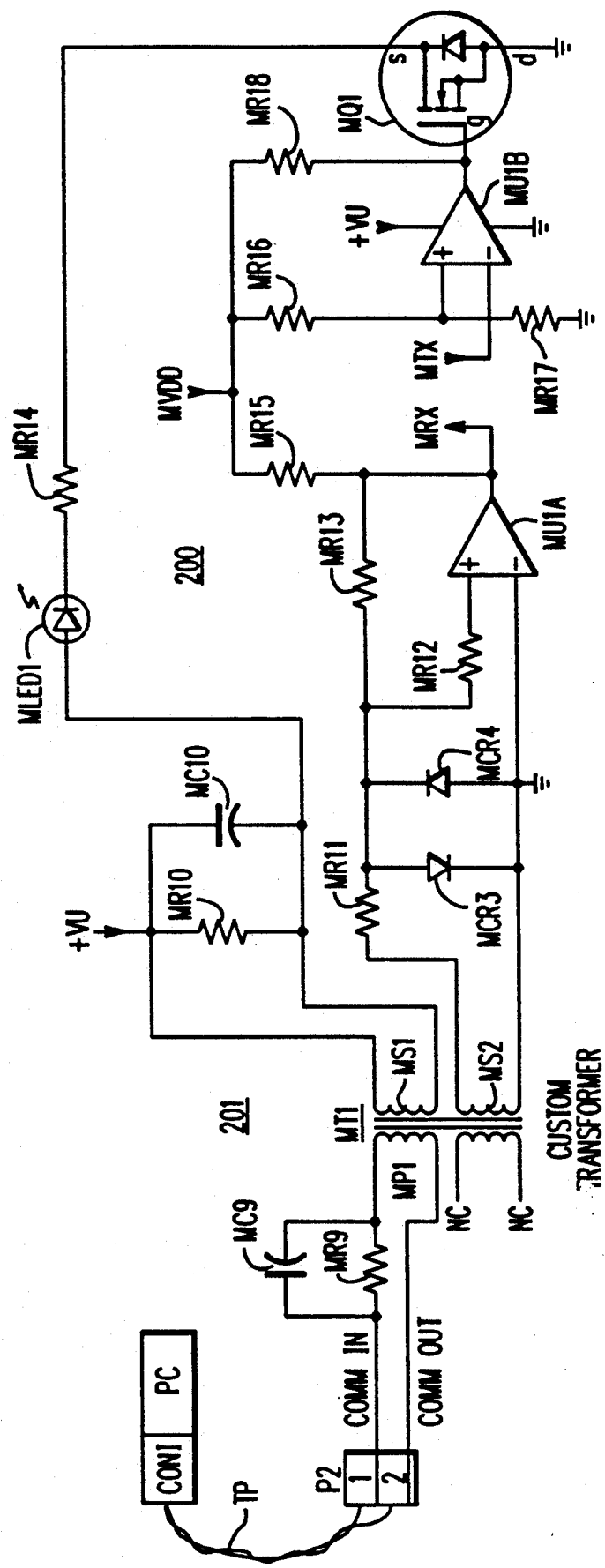
FIG. 4 shows a schematic diagram of part of the communication or monitor portion of the apparatus shown in FIG. 2.

Referring specifically to FIGS. 2 and 4, there is provided an input network 201 for module 200 which includes an input port or connector P2. Terminal 1 of input connector P2 is connected to one side of a resistive element MR9 and one side of a capacitive element MC9. The input terminal 1 of the connector P2 is designated "COMM IN". The other side of capacitive element MC9, and the other side of resistive element MR9 are connected to one side of a first primary winding MP1 of a transformer MT1. Terminal 2 of connector P2 is connected to the other terminal of the transformer winding MP1 of the transformer MT1. Terminal 2 of connector P2 is designated "COMM OUT". The secondary windings of the transformer MT1 are designated MS1 and MS2. Connected in parallel across the secondary winding MS1 are resistive element MR10 and a capacitive element MC10. Connected to the high side of the capacitive element MC10 is a voltage +VU which is provided from a power supply which will be described hereinafter. Connected to one side of the secondary winding MS2 is one side of a resistive element MR11, the other side of which is connected to the anode of a diode MCR3. The cathode of the diode MCR3 is connected to the other side of the transformer secondary winding MS2. Connected in parallel with a diode MCR3 is a second diode MCR4 connected in an anode-to-cathode cathode-to-anode relationship. Connected to the anode of the diode MCR3 is one side of a resistive element MR12 and one side of a resistive element MR13. The other side of a resistive element MR12 is connected to the positive input terminal of a isolating amplifier MU1A. The negative input terminal of the amplifier MU1A, the anode of the diode MCR4, and the cathode of the diode MCR3 are connected to ground The other side of the resistive element MR13 is connected to the output of the amplifier MU1A and to one side of a resistive element MR15. The output of the amplifier MU1A provides the MRX signal for the chip MU4 as described previously. The other side of the resistive element MR15 is connected to one side of a resistive element MR16, one side of a resistive element MR18, and to voltage VDD. The other side of the resistive element MR16 is connected to the positive input terminal of a amplifier MU1B and to one side of a resistive element MR17. The negative terminal of the amplifier MU1B receives the MTX output signal from the chip MU4 as described previously. The amplifier MU1B is interconnected with the voltage source +VU and with ground in an appropriate manner. The output of the amplifier MU1B is connected to the other side of the resistive element MR18 and to the gate of a Field Effect Transistor (FET) device MQ1. The drain of the transistor device MQ1 is connected to ground as is the other side of the resistive element MR17. The source of the transistor device MQ1 is connected to one side of a resistive element MR14, the other side of which is connected to the cathode of a light-emitting diode MLED1, the anode of which is connected to common terminal between the previously described resistive element MR10 and capacitive element MC10.

Referring now to FIGS. 11A-11D, the operation of the communications module 200 will be described. In particular, there is provided connector P2 which represents the first stage of the input network 201 for the communications device 200. Connector P2 is interconnectable with a communications interface CONI "Computer Operated Network Interface" in a remote personal computer PC in a manner which will described hereinafter. Terminal 1 of connector P2 interconnects with the line designated COMM IN which feeds through the capacitive element MC9 and a resistive element MR9, which operate as a filter. There is provided transformer MT1 having the one side of the primary winding MP1 thereof connected to COMM IN line and the other side thereof connected to the COMM OUT line which, in turn, is connected to terminal 1 of connector P2. The pair of secondaries MS1, MS2 for transformer CT1 interact with the remaining part of the communications module 200. Resistive element MR11 is a current-limiting element and diodes MCR3, MCR4 are clipping diodes. The result of the action of the clipping diodes MCR3, MCR4 is to take the AC signal which is provided by the secondary winding MS2 of the transformer MT1 and clip the voltage to near zero in both the positive and negative direction Resistive element MR12 feeds the positive .terminal of the amplifier MU1A, the negative terminal of which is grounded. The output terminal of the amplifier MU1A provides the output signal MRX. Amplifier MU1A basically operates as a squaring device, which ensures that the signal MRX has an acceptable square wave shape. Resistive element MR13 provides hysteresis for the amplifier MU1A so that it does not oscillate about a single value. Resistive element MR15 is a pull-up resistor; that is because the output of the amplifier MU1A is of the open collector variety There is also provided a similar amplifier MU1B which has available to the negative terminal thereof the signal MTX, which will be described more fully hereinafter. Signal MTX is either a 5 V or a 0 V signal. Resistive elements MR16, MR17 are bias resistors which place a bias of approximately 2.5 V on the positive terminal of the amplifier MU1B. Resistive element MR18 is a pull-up resistor similar to resistive element MR15. When the output of the amplifier MU1B is high or at a digital 1, the field effects transistor MQ1 is energized or turned on, thus drawing electrical current through current-limiting resistive element MR14, and through the light-emitting diode element MLED1. Energization of the light-emitting diode element MLED1 is an indication to the user that the entire unit is, in fact, in a transmitting mode. Resistive element MR10 and capacitive element MC10 merely act in combination as a noise filter. Field effects transistor MQ1 is an oscillating device, and when it is turned on it provides an oscillating AC signal which generates a signal across the transistor secondary MS1 for application to the communications network represented by the lines COMM IN and COMM OUT. This is true even though the signal MTX is an ON/OFF type DC signal. Consequently, element MQ1, which may be a metal oxide FET transformer is a modulator. On the other hand, the operation of the input circuit represented by resistive element MR11, diodes MCR3, MCR4 and resistive elements MR12, MR13, MR15 and amplifier MU1A act as a demodulator network.

Attention is now called to the rotary switches MSW1, MSW2, MSW3 of FIG. 5. Basically, these switches provide address information for the entire network. It does this by providing in digital code to the INCOM chip MU4. Once the INCOM chip MU4 has its address, when a signal MRX is delivered to the INCOM chip MU4 by way of the input network 201 previously described, the INCOM chip MU4 scans the address information provided in part of the transmission to terminal MRX and decides whether the INCOM chip has been properly addressed or not. If the INCOM chip has been properly addressed in compliance with the address information provided by the switches MSW1 through MSW3, the INCOM chip MU4 will operate to receive further information from the communication network and provide the useful functions to be described hereinafter. Obviously, address information is provided from the switches MSW1 through MSW3 by way of the twelve lines interconnected with the input terminals AO through all of the INCOM chip MU4. The RX and TX terminals which interconnect with the MRX and MTX signals respectively of the input circuit 201 as described previously are shown on the INCOM chip MU4. INCOM chip terminals OSC1 and OSC2 are interconnected with a well-known oscillator circuit arrangement comprising capacitive elements MC1, MC4, resistive element MR1, and crystal MY1. Capacitive element MC3 which is interconnected between ground and combination of the input VCC voltage and the power supply voltage +5 V is a bypass capacitor. Basically, data provided to the INCOM chip MU4 by way of the input terminal RX or taken from the input chip MU4 by way of the terminal TX is transmitted back and forth by way of this serial data line SCRDAT to and from a microprocessor CU5 by way of connector P1 in a manner to be described hereinafter. Consequently, INCOM data from the external personal computer PC which comes into the input network 201 by way of connector P2 is properly demodulated and sent to the INCOM chip MU4 by way of terminal RX, and fed from the INCOM chip MU4 to a microprocessor CU5 by way of the serial data line SERDAT. Outgoing digital information from the microprocessor CU5 traverses the serial data line SCRDAT in the opposite direction, is routed by way of the INCOM chip CU4 to the terminal TX, and thence to the input network 201 where it is modulated and provided to the personal computer PC as an output by way of the connector P2.

Figure 5A:
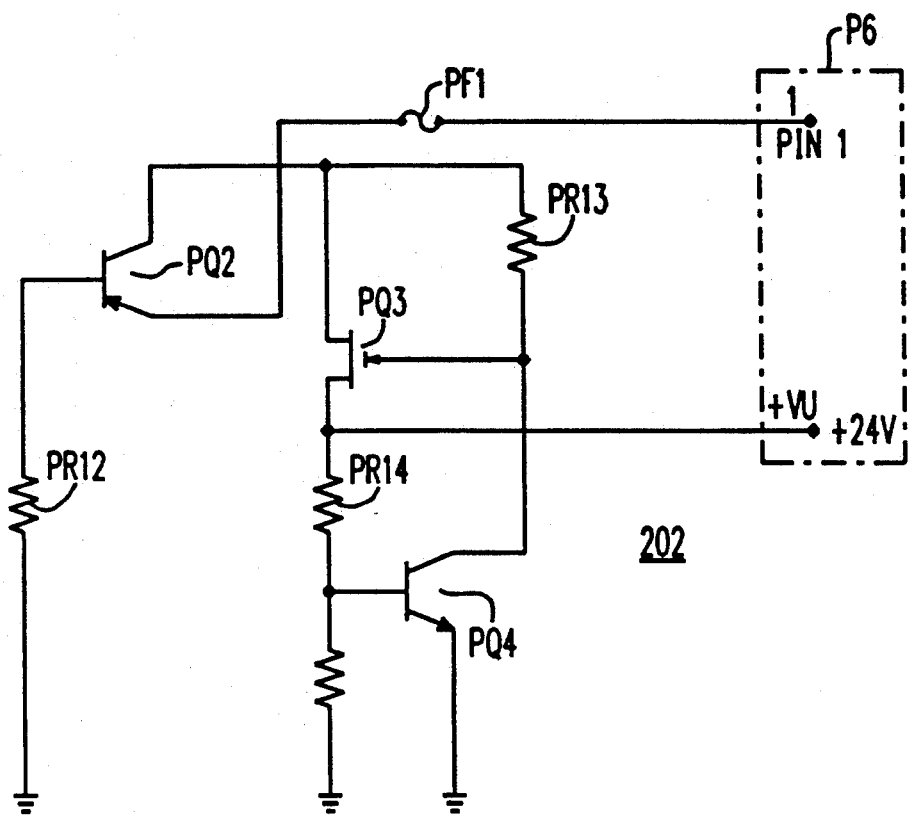

Referring to FIG. 5A a power supply 202 for the communication module 201 is shown. Power is received by way of an interconnection between the main control circuitry as will be described hereinafter with respect to FIG. 6 and the communications option connector at pin 1 of connector P6. In this embodiment of the invention, pin 1 is interconnected by way of a fuse PF1 with the emitter of transistor PQ2, the base of which is interconnected by way of resistive element PR12 to system common or ground (hereinafter ground). The collector of transistor PQ2 is connected to one side of resistive element PR13 and to the drain of a field effects transistor PQ3. The gate of the field effects transistor PQ3 is connected to the other side of the resistive element PR13 and to the collector of transistor PQ4. The source of the field effects transistor PQ3 is connected to provide a voltage Vu 24 V power supply output for the network of FIG. 4. The source of the field effects transistor PQ3 is also connected to one side of resistive element PR14. The other side of which is connected to the base of transistor PQ4 and to one side of another resistive element PR15. The other side of the resistive element PR15 and the emitter of the transistor PQ4 are connected to ground.

Referring now to FIGS. 6A through 6H, the circuitry for the "backboard" and "display board" of the monitoring device 10 is shown. In particular, in FIG. 6A, there is provided an input connector P3 having pins 1, 2, 3 and 4 to which phases A, B, C and ground are interconnected for monitoring the appropriate voltages in a three phase AC system to be monitored by device 10. At pin 1 of connector P3 representing phase A of the 120 V source is interconnected with one side of resistive element CR1, the regulating terminal of a varistor CRV1 and one side of resistive element CR11. The other side of the varistor CRV1 is connected to ground. The other side of resistive element CR1 is for connected to the negative input terminal of an operational amplifier CU10 to one side of capacitive element CR7 and the one side of resistive element CC30. The other side of capacitive element CR7 and the other side of resistive element CC30 are connected to the output terminal of the operational amplifier COA. This latter point represents the voltage VA which will be utilized hereinafter with respect to the input circuitry used in conjunction with the microprocessor CU5 which will be described hereinafter.

The latter mentioned circuitry constitutes an input circuit CIA for voltage VA. In a like manner, input circuits CIB and CIC are provided for voltages VB and VC. It should be noted with respect to the operational amplifier COA that the positive input terminal thereof is connected to pin designated ZB of a 2:1 multiplexer CU1 which will be described more fully hereinafter. Input terminal 2 of connector P3 is connected to one side of resistive element CR3. In a like manner, input terminal 3 of connector P3 is connected one side of resistive element CR5. The other side of resistive elements CR1, CR3 and CR5 are interconnected to terminals 2, 5 and 10, respectively of connector P4 for cable 30 to provide a path for the interconnection of separate input voltage sources for the circuitry of FIG. 6A in a manner which will be described hereinafter In the like manner pins 2 and 3 of connector P3 are interconnected to one side of resistive elements CR14 and CR15 respectively. The other resides of resistive elements CR11, CR14 and CR15 are connected to terminals 22, 23 and 24, respectively of connector P4 for cable 30. Capacitive element CC5 and resistive element R17 are interconnected with the latter mentioned side of resistive element CR11 and act together as a filter. Also interconnected with the latter mentioned side of resistive element CR11 is the YOA input to the previously described 2:1 multiplexer CU1. Connected to the other side of resistive element CR14 is the filter arrangement comprising capacitive element CC4 and resistive element CR16 as well as the input terminal YOB of the 2:1 multiplexer CU1. Lastly, connected to the other side of resistive element CR15 is one side of a capacitive element CC6 and a filter resistive element CR18 as well as input terminal YOC of the 2:1 multiplexer CU1. The ZC, ZA and ZB output terminals of the multiplexer CU1 are connected, respectively, to the positive input terminal of the input network CIC the positive input terminal of the network CIA—the positive terminal of the operational amplifier COA as described previously—and the positive input terminal of the input network CIB. Inputs A, B, C of the 2:1 multiplexer CU1 are connected to receive the SELA, SELB and SELC signals from the multiplexer CU5 which will be described in greater detail hereinafter. Depending upon the presence or absence of signals SEL A, SEL B and/or SEL C the input circuits C1A, C1B and C1C may be operated in a differential mode to provide line to neutral voltages VA-N, VB-N or VC-N as shown on the front panel of monitor 10 of FIG. 1 or line to line voltages VA-B, VB-C, VC-A at terminals VA, VB or VC respectively Comparator CU13 is interconnected with the A and B phases at the terminals YOA and YOB of the multiplexer CU1. They are connected in such a manner that phase A voltage is connected to the negative input terminal of the comparator CU13 and phase B voltage is connected to the positive input terminal of comparator CU13. Connected to the output of comparator CU13 is one side of resistive element CR37 and one side of resistive element CR38 The other side of resistive element CR38 is connected to one side of a resistive element CR39 and to the cathode of a diode CD2. The other side of resistive element R39 is connected to one side of capacitive element CC48 the other side of which is interconnected with the anode of diode CD2 and to ground. The junction between the resistive element CR39 and the capacitive element CC48 provides the FREQ output signal utilized by the microprocessor CU5 at input terminal T21C1 thereof in a manner which will be described hereinafter. The output of a comparator CU13 may be a 60 hertz square wave. It will have half of the period of the input signal. The voltage at the junction between the resistive element R38 and R39 is half-wave rectified and filtered by the capacitive element CC48 to provide a square-wave signal that varies generally between 0 and 5 V at the frequency of the AC input at terminals 1 and 2 of connector P3.

Figure 6A:
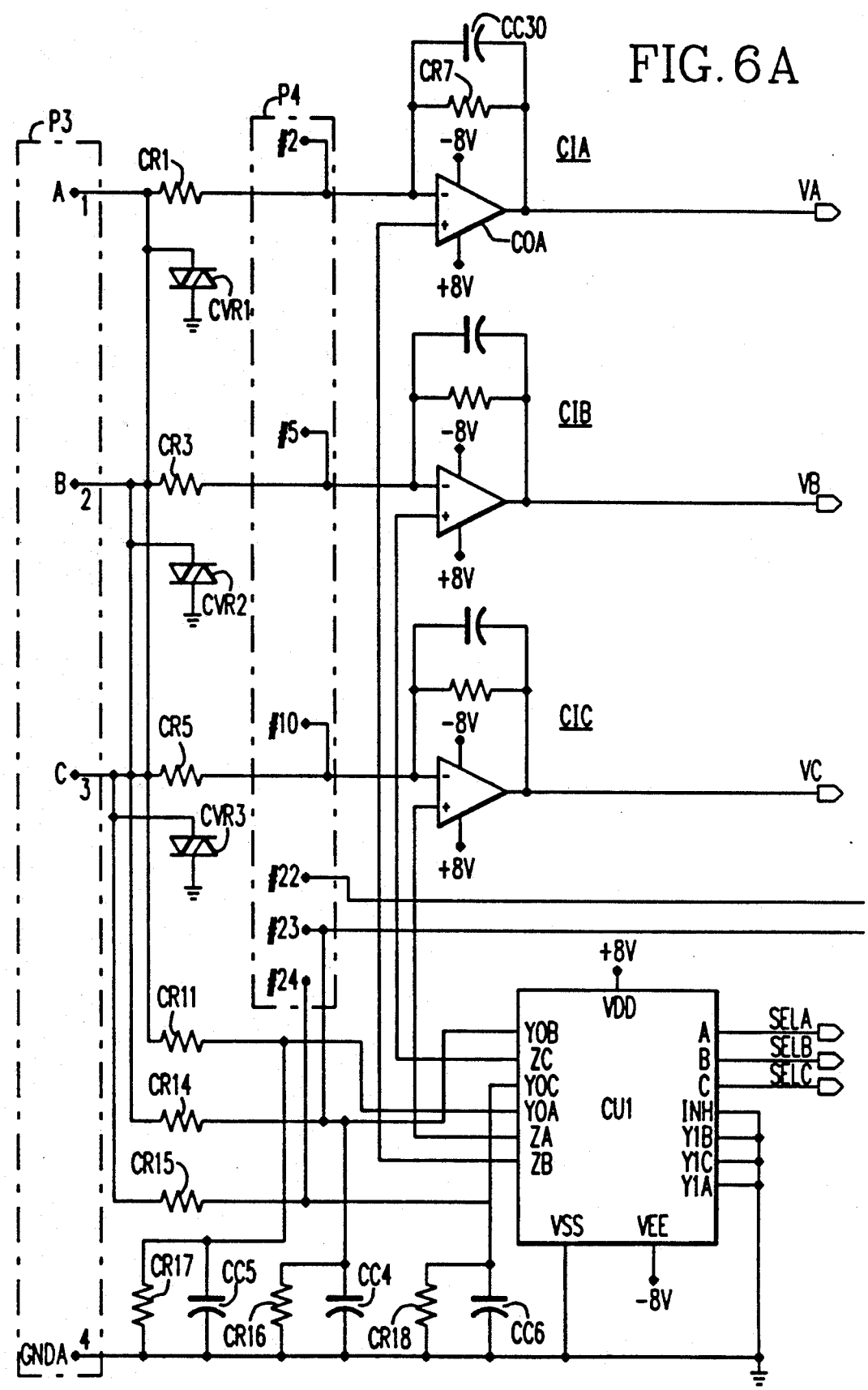
Figure 6B:
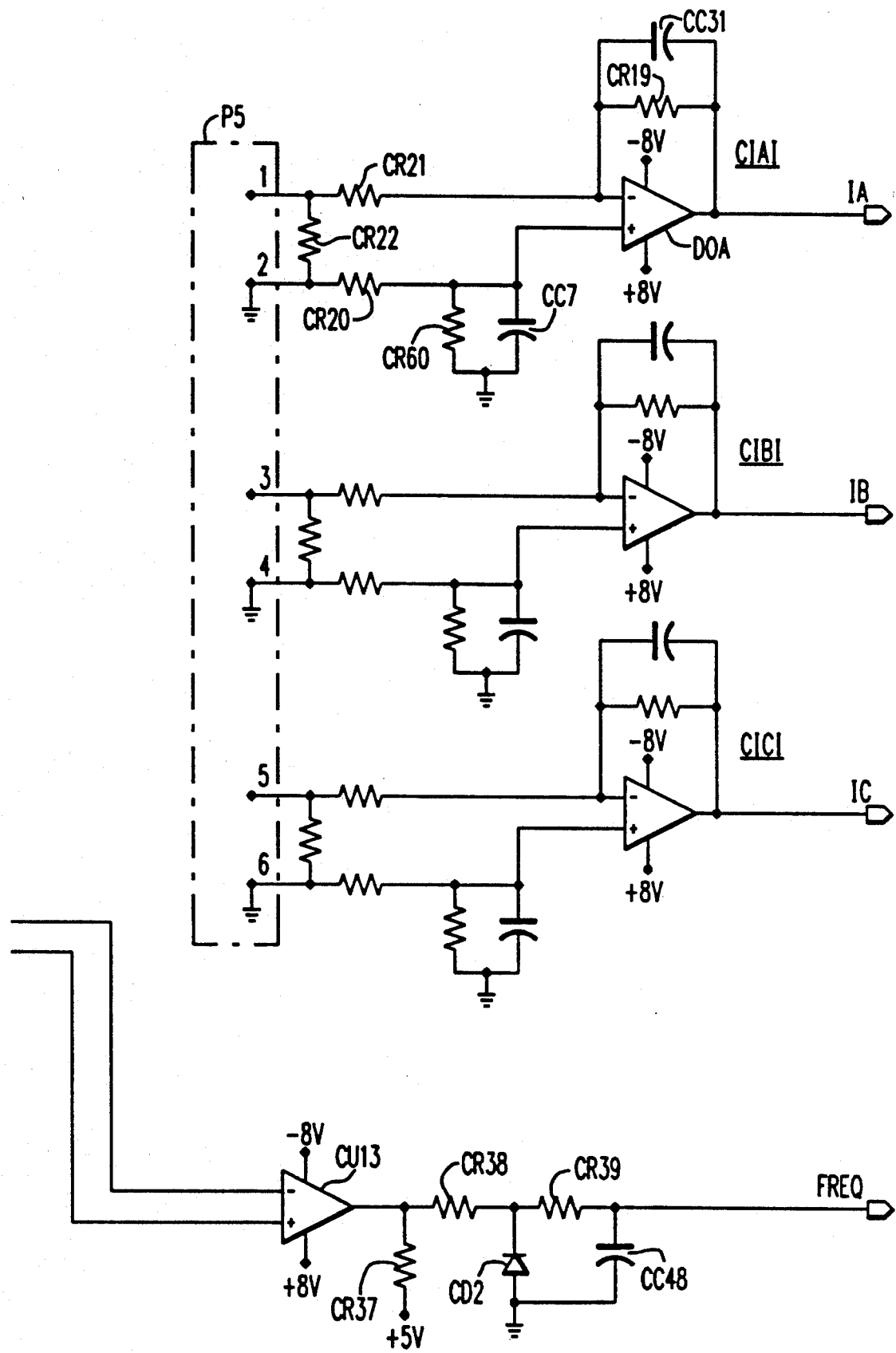

Referring now to FIG. 6B, circuitry for deriving voltages representing electrical current input signals for the monitor 10 is shown. In particular, there is provided an input connector P5 which has interconnected therewith sensors for measuring electrical currents which are to be monitored by the device 10. The interconnection is in the following way, terminals 2, 4 and 6 of connector P5 are grounded and terminals 1, 3 and 5 have serially provides thereto electrical currents for phase A, B and C, respectively of the device being monitored. Input terminal 1 of connector P5 is connected to one side of a resistive element CR22 and one side of resistive element is CR21. The other side of resistive element CR22 is connected to one side of resistive element CR20 and to the grounded input terminal or pin 2 of the connector P5. The other side of resistive element CR21 is connected to the negative input terminal of a differential operational amplifier DOA; one side of resistive element CR19 and one side of capacitive element CC31. The other side of capacitive element CC31 and the other side of resistive element of CR19 are connected to the output terminal of the differential amplifier DOA which generates a voltage signal IA representative of the appropriate phase current. This signal is provided as will be described hereinafter to be utilized hereinafter with respect to the input circuitry for microprocessor CU5. The other side of resistive element CR20 is connected to one side of resistive element CR60. One side of capacitive element CC7 and to the positive input terminal of the differential amplifier DOA. The other side of resistive element CR60 and the other side of capacitive element CC7 is connected to ground. The input circuitry designated CIAI for providing the output signal IA encompasses all the foregoing from resistive element CR22 on the left to the output terminal designated for signal IA on the right of FIG. 6B. In the like manner, duplicate input circuits of CIBI and CICI are provided for producing signals IB and IC respectively. Pin 3 of connector P5 and pin 4 of connector P5 are connected to input terminals of circuit CIBI, pin 5 and pin 6 of connector P5 are connected to circuit CICI. Basically, differential amplifier DOA samples the voltage across resistive element CR22. The gain of the operational amplifier DOA is the value of the resistive element CR19 divided by the value of the resistive element CR21. Resistive elements CR20, CR60 and capacitive element CC7 provide a reference point to give the differential amplifier DOA a starting point.

Figure 6C:
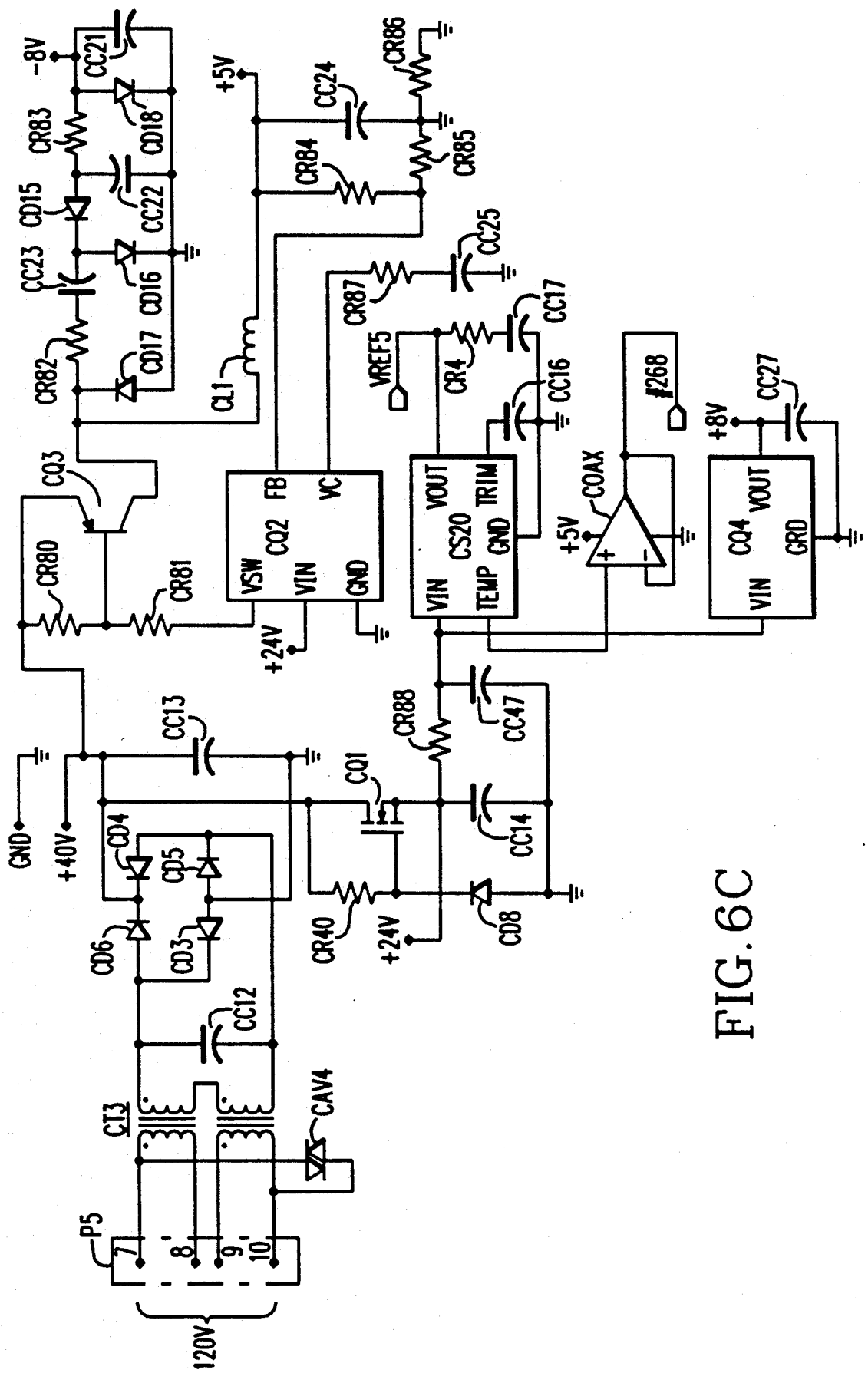
Figure 6D:
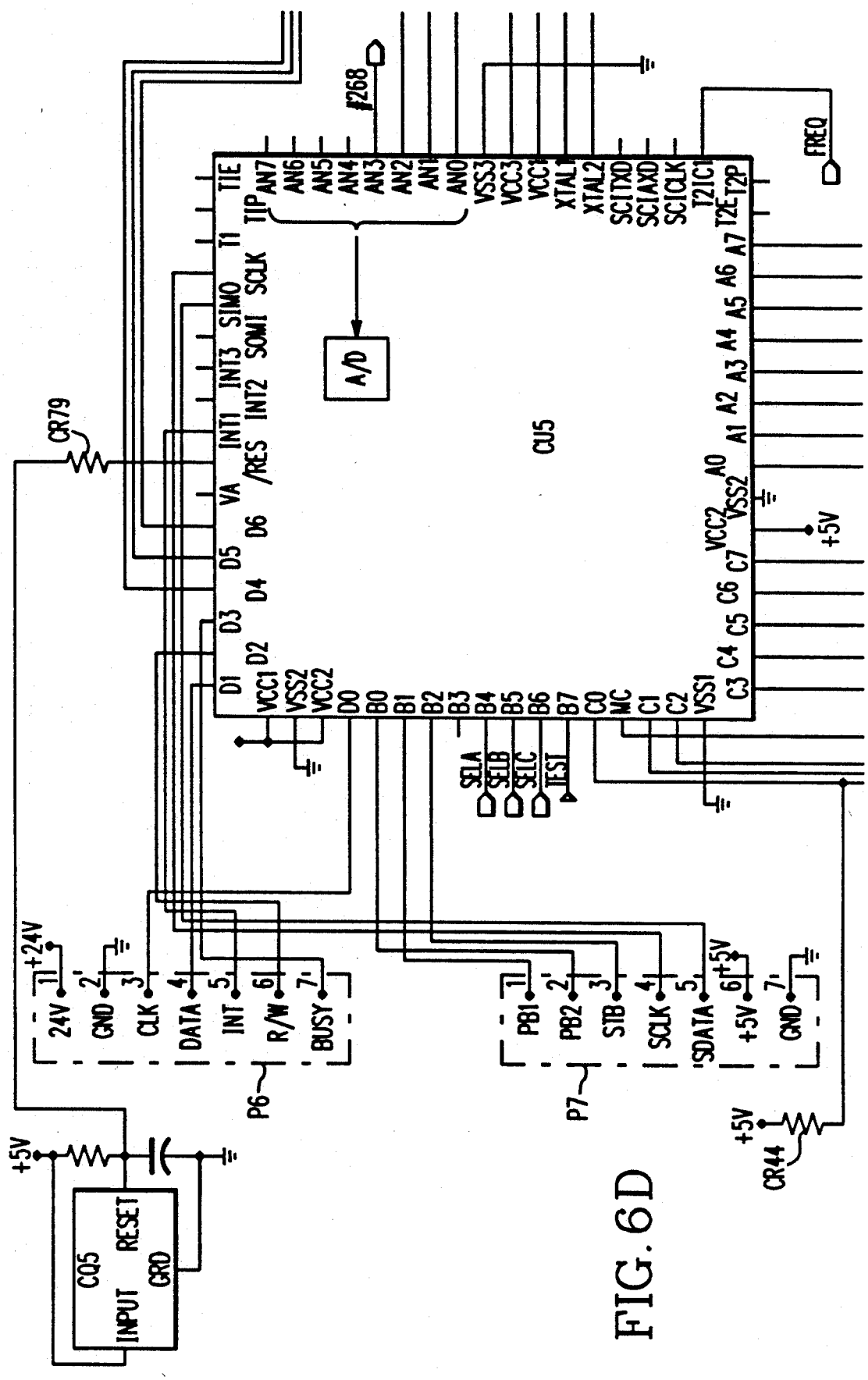

Referring now to FIG. 6C, the internal power supply for the circuitry of FIG. 6 is shown. In particular, there are input terminals 7, 8, 9 and 10 of connector P5 upon which 120 V AC is provided Terminal 10 is a system common and- may be grounded for a 3 phase Y connected input voltage. Terminal 7 is connected to one side of the primary winding of a transformer CT3 whereas terminal 8 is connected to the other side thereof. In a like manner, terminal 9 is connected to one side of a second primary winding of the transformer CT3, the other side of which is connected to terminal 10. These 4 terminals may be supplied with 120 V or 240 V three phase AC from an external source. There is provided a varistor CAV4 between pin 7 and pin 10. It is utilized for noise suppression and transient suppression. Transformer CT3 is a step down transformer such that the secondary winding thereof provides 24 V AC when the input is 120 V AC. Capacitive element CC12 is connected across the output of the secondary winding CT3. One side of capacitive element CC12 is connected to the anode of diode element CD6 and the cathode of diode element CD3. The cathode of diode element CD6 is connected to the cathode of a diode element CD4 and the anode of a diode element CD3 is connected to the anode of diode element CD5. The junction point between the cathode of diode element CD5 and the anode of diode element CD4 is connected to the other side of the capacitive element C12 such that diode elements CD3 through CD6 form a full wave bridge rectifier. The junction between the cathodes of diode elements CD6 and CD4 is connected to a +40 V output voltage terminal at pin 8 of connector P4. It is also connected to one side of capacitive element C13, one side of resistive element CR80 and the emitter of transistor CQ3. The anodes of diode elements CD3 and CD5 are connected to the other side of the capacitive element C13 and to ground. The other side of resistive elements CR80 is connected to the base of the transistor CQ3 and one side of resistive element CR81. The collector of the transistor CQ3 is connected to one side of resistive element CR82, to the cathode of diode CD17 and to one side of an inductive element or choke CL1. The other side of resistive element CR82 is connected to one side of capacitive element CC23 the other side of which is connected to the anode of diode CD16 and the cathode of diode CD15. The anode of diode CD15 is connected to one side of capacitive element CC22 and to one side of resistive element CR83. The other side of the resistive element CR83 is connected to one side of capacitive element CC21 and to the anode of a Zener diode CD18. The other side of capacitive elements CC21 and CC22 as well as the cathode of diode CD16, the anode of diode CD17 and the cathode or regulating terminal of the Zener diode CD18 are connected to ground. The other side of the inductive element CL1 is connected to one side of resistive element CR84 and one side of capacitive element CC24. The other side of the resistive element CR84 is connected to one side of resistive element CR85 and to the 5 V terminal designated "FB" of a supervisory circuit CQ2. The other side of resistive element CR81 is connected to the "VSW" terminal of the supervisory circuit CQ2. +24 V is provided as an input at the "VIN" terminal of the supervisory circuit CQ2. The "VC" terminal of the supervisory circuit CQ2 is connected to one side of resistive element CR87 the other side of which is connected to one side of capacitive element CC25 the other side of which is connected to ground. The junction between the cathodes of the aforementioned diodes CD6 and CD4 is also connected to one side of resistive element CR40 and to the drain of transistor CQ1. The gate of transistor CQ1 is connected to the other side of the resistive element CR40 and to the regulating terminal of a Zener diode CD8. The source of the transistor CQ1 is connected to one side of resistive element CR88 and one side of capacitive element CC14. The other side of resistive element CR88 is connected to the "VIN" terminal of a reference voltage generator device CS20 and to one side of a capacitive element CC47. The other sides of capacitive elements CC14 and CC47 as well as the anode of the Zener diode CD8 is connected to ground.

The source of the transistor CQ1 supplies the +24 V output power which is provided for example to the "VIN" input of the transistor CQ1. The "VOUT3[ terminal of the device CS20 is connected to one side of resistive element CR41 the other side of which is connected to one side of capacitive element CC17 the other side of which is to ground. The "TRIM" terminal of the device CS20 is connected to one side of capacitive element CC16 the other side of which is connected to ground. The "TEMP" terminal of the device CS20 is connected to the positive terminal of an operational amplifier COAX the output of which is fed back to the negative input terminal thereof. This terminal in turn is connected to the AN3 input of the microprocessor CU5 in a manner which will be described hereinafter. The "VIN" terminal of the device CS20 is also connected to the "VIN" terminal of a regulating device CQ4. The VOUT terminal of CQ4 is connected to one side of capacitive element CC27 the other side of which is connected to the ground. Pin 9 on connector P4 is interconnected to ground.

The power supply circuity of FIG. 6C provides the following voltages: +40 V dc is present at the junction of the cathodes of diodes CD6 and CD4, −8 V dc is present between the junction of the resistive element CR83 and the capacitive element CC21, +5V dc is present between the junction of the choke or inductor element CL1 and the capacitive element CC24, the signal VREF5 is present at the "VOUT" terminal of the device CS20, +8 V dc is present at the "VOUT" terminal of the transistor device CQ4 and +24 V is present at the source of the transistor element CQ1.

Resistive elements CR80 and CR81 are part of the switching mode power supply. Resistive elements CR84 and CR85 form a voltage divider which is fed back to the "FB" terminal of supervisory circuit CQ2. That voltage is supposed to stay at 5 V. When the voltage +5 at the junction between the choke element CL1 and the capacitive element CC24 attempts to go below +5 V, supervisory circuit Q2 switches the VSW terminal thereof to ground This sinks current through resistive element CR80 and CR81 turning on transistor element CQ3 which then places 40 V at the other side of the inductive element CL1 which starts to charge inductive element CL1 and capacitive element CC24 so that the voltage therebetween starts to rise . towards +5 V. As that voltage continues to increase in response to current flow through inductor element of CL1 and capacitive element CC22 continues to charge, the voltage gets above +5 V feedback pin "B" will turn "VSW" off which will cause transistor element CQ3 to turn off which will discharge the circuit including elements CL1 and CC24. This will continue to happen at the rate of 40 kilohertz. Device CQ2 is a pulse width modulated device which varies with duty cycle depending on how much current is called for.

When transistor element CQ3 has been turned off inductor element CL1 will want to continue current flow into the +5 V terminal. To do that diode CD17 is brought into forward conduction and pulls electrical charge from ground through capacitive element CC22, through diode CD15, through capacitive element CC23 and resistive element CR82. When that ceases diode CD16 shorts to ground. This discharges capacitive element CC23 in the opposite direction. When the inductive element CL1 begins to charge again capacitive element CC22 is pumped to a negative voltage. This applies a negative voltage to resistive element CR83 which limits the current that can be drawn out of capacitive element CC22. Zener diode CD18 limits the voltage to −8 V and capacitive element C21 acts as a filter.

Zener diode CD8 is set to approximately +30 V. The "source" drop of the transistor CQ1 is approximately 6 V. Consequently the source of transistor CQ1 is at approximately +24 V. Device CC14 is a filter capacitor Resistive elements CR88 and CC47 are low pass filter elements that feed the reference device CS20. This provides a highly filtered voltage at the VOUT terminal of the device CS20 in accordance with the filtering provided by filter elements CR4 and CC17.

Resistive element CR87 and capacitive element CC25 are a frequency compensation network for error that may exist inside the CQ2 device which would keep it in an unstable state if not corrected The "TEMP" output terminal of the device CS20 is fed to the operational amplifier COAX and provides an output that is related to the temperature inside the casing of the monitor 10. This is provided as was described previously by way of the VREF5 signal to the microprocessor CU5 for providing temperature compensation. Device CQ4 is a volt regulator.

Referring now to FIGS. 6D through 6H, the microprocessor and display portions of the circuitry of the circuit boards of the monitor 10 are depicted. Device CQ5 is a low voltage reset circuit that supervises or monitors the 5 V power supply such that if that voltage drops below a predetermined value which in a preferred embodiment of the invention is 4.7 V it will operate by way of its reset terminal through the /RES input terminal of the microprocessor CU5 to reset the microprocessor. It does this by way of resistive element CR79.

Device CU6 is an 8:1 multiplexer. There is connected to the 0-2 input terminals thereof the voltage signals VA, VB and VC and to the 3-5 input terminals thereof the voltage signals IA, IB and IC. The com terminal of device CU6 is connected to the positive input terminal of an operational amplifier CU9. The output terminal of which is fed back to the negative input terminal thereof and to the positive input terminal of a second operational amplifier CU9A. The negative input terminal of the operational amplifier CU9 and the positive input terminal of the operational amplifier CU9A are connected to one end of resistive element CR66. The output terminal of the operational amplifier U9A is connected to one side of a string of four resistive elements CR69 through CR72 connected in series between the output terminal and ground. The junction point between the resistive elements CR71 and CR72 is fed back to the negative input terminal of the operational amplifier CU9A. The output of the operational amplifier CU9A is also fed to one side of a resistive element R64 the other side of which is connected to one side of a resistive element CR63, The anode of a diode CD10 and the cathode of diode CD9 the anode of which is connected to ground. The cathode of diode CD10 is connected to the +5 V power supply. The other side of the resistive element CR63 is connected to the AN1 input terminal of the microprocessor CU5. All of the AN terminals, i.e., AN0 through AN7, of the microprocessor CU5 are inputs for an internal A/D convertor. The output of the operational amplifier CU9A is also connected to the positive input terminal of a comparator CCOMP the output of which is connected to the junction between two resistive elements CR73 and CR75. The other side of resistive element CR75 is connected to the +5 V power supply. The other side of the resistive element CR73 is connected to one side of resistive element CR74 and to the cathode of diode CD14 the anode of which is connected to ground. The other side of the resistive element CR74 is connected to the AN2 input terminal of the microprocessor CU5. The VCCI terminal of microprocessor CU5 is connected to the +5 V power supply. The resistive element CR76 is connected at one side to the +5 V power supply and connected at the other side thereof to one side of a resistive element CR77 and to the negative input terminal of the comparator CCOMP. The other side of resistive element CR77 is connected to ground. As was described previously, the output terminal "268" of the operational amplifier COAX of FIG. 6C is connected to the input terminal AN3 of the microprocessor CU5. In a like manner the VREF5 input signal is connected to the VCC3 terminal of the microprocessor CU5. Connected to the AN0 input terminal of the microprocessor CU5 is one side of resistive element CR65, the other side of which is connected to the other side of the previously mentioned resistive element CR66, the anode of a diode CD12, and the cathode of diode CD11. The cathode of diode CD12 is connected to the +5 V power supply and the anode of diode CD11 is connected to ground. Connected across the XTAL1 and XTAL2 terminals of the microprocessor CU5 are either side of a crystal CY1. ,Also connected to the XTAL1 terminal is one side of capacitive element CC19 connected to the XTAL2 input terminal is one side of capacitive element C19A. The other side of capacitive element CC19 and C19A are connected to ground. The VSS3 terminal of the microprocessor CU5 is connected to ground. The T21C1 terminal of the microprocessor CU5 has impressed thereupon the FREQ signal described previously.

Device CU6 is an 8:1 multiplexer. Its A, B, and C control terminals thereof are connected respectively to the D4, D5, and D6 terminals of the microprocessor CU5 so that the microprocessor CU5 may control the multiplexing action thereof.

Connector P6 is interconnected with voltage sources and the microprocessor CU5 in a manner to be described hereinafter. The following values are externally on pins 1 through 7 of the connector P6. +24 V is on pin 1. GND is on pin 2. The signal CLK on pin 3. The signal DATA on pin 4. The signal INT on pin 5. The signal R/W on pin 6 and the signal BUSY on pin 7. Pin 1 is connected internally to the +24 V power supply. Pin 2 is connected internally to ground. Pin 3 is connected to the D0 at terminal of the microprocessor CU5. Pin 4 is connected to the D1 terminal thereof. Pin 5 is connected to the INT1 terminal thereof. Pin 6 is connected to the D2 terminal thereof and Pin 7 is connected to the D3 terminal thereof.

An internal board to board connector designated P7 has impressed on the terminals of microprocessor C5 the following signals: pin 1, PB1; pin 2, PB2; pin 3, STB, pin 4, SCLK; pin 5, SDATA; pin 6, +5 V; pin 7, GND. Connector P7 is internally connected to the microprocessor in the following manner: pin 1 is connected to the B1 terminal; pin 2 to the B0 terminal; pin 3 to the B2 terminal, pin 4 to the SCLK terminal; pin 5 to the SI MO terminal. Pin 6 is connected the +5 V power supply and pin 7 is internally grounded.

There is a set of dip switches designated CSW1 and CSW2 as shown in FIG. 3. Each of the switches CSW1 and CSW2 is an eight pole single throw switch the common terminal of which is connected to ground in each case. The control terminals are connected to one side each of resistive elements RN5-RN19 and CR44, the other side of which is connected to the +5 V power supply. The control terminals are also connected to the microprocessor CU5. The control terminals 1, 2, 3, 4, 5, 6, 7, 8 of switch CSW1 are connected to the A7, A6, A5, A4, A3, A2, A1, and A0 input terminals respectively of the microprocessor CU5. Control terminal 1, 2, 3, 4, 5, 6, 7, and 8 of switch CSW2 are connected to terminals C7, C6, C5, C4, C3, C2, Cl and C0 respectively of the microprocessor CU5.

The VSS1 and VSS2 terminals of the microprocessor CU5 are grounded and the VCC1 and VCC2 input terminals of the microprocessor CU5 are connected to the +5V power supply. The MC terminal of the microprocessor CU5 is connected by way of resistive element CR89 to ground.

Figure 6E:
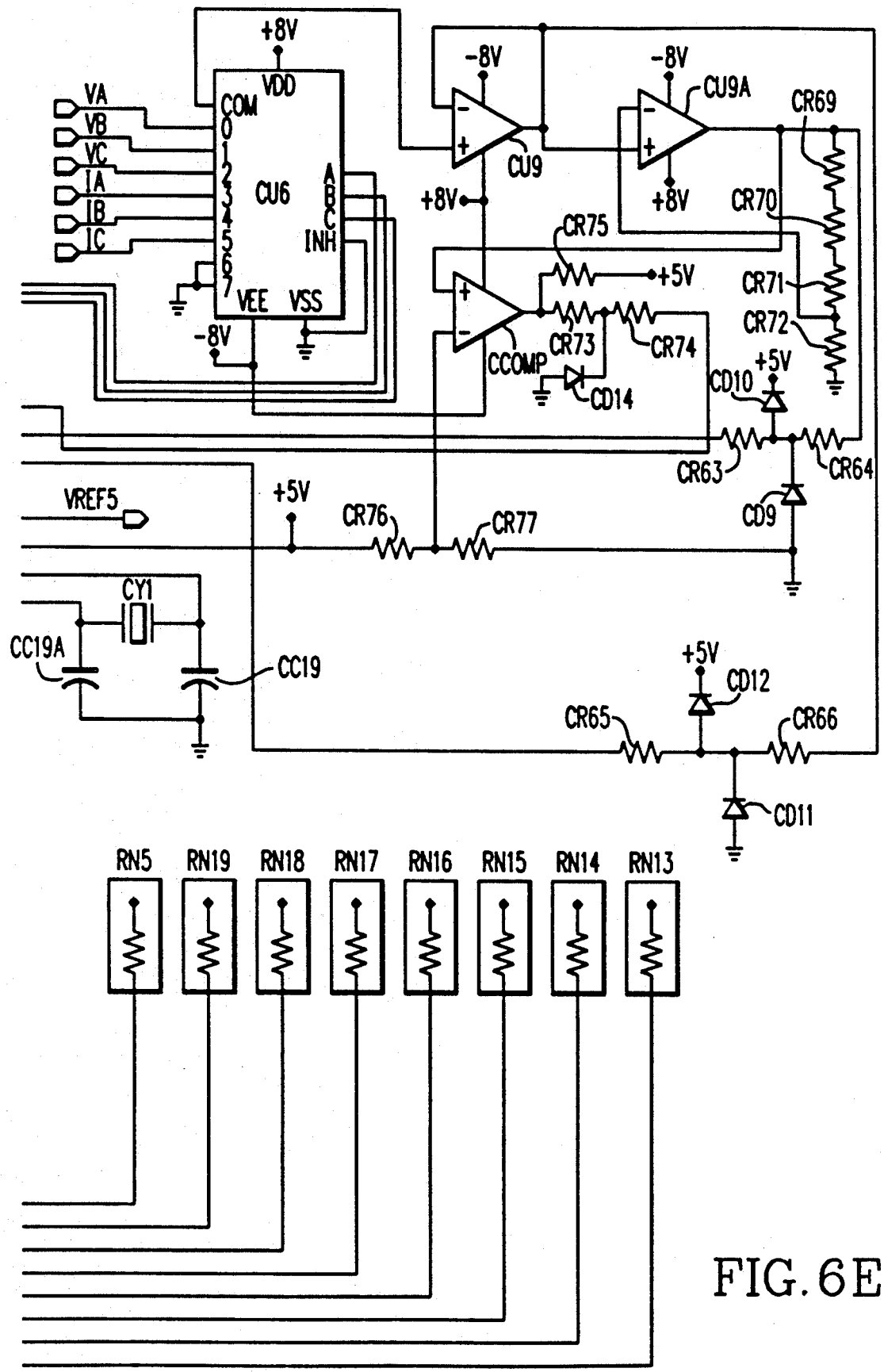
Figure 6G:
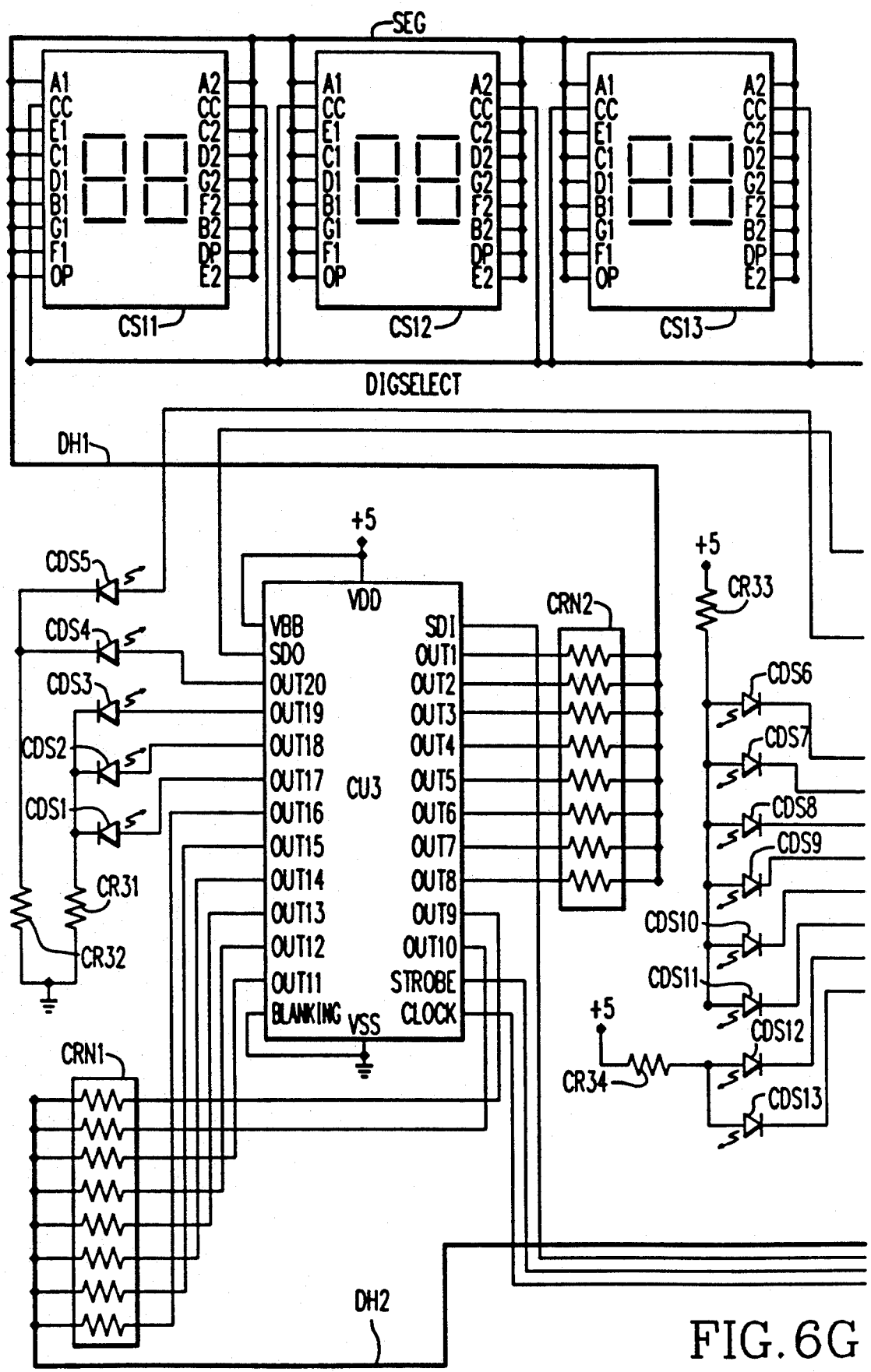
Figure 6H:
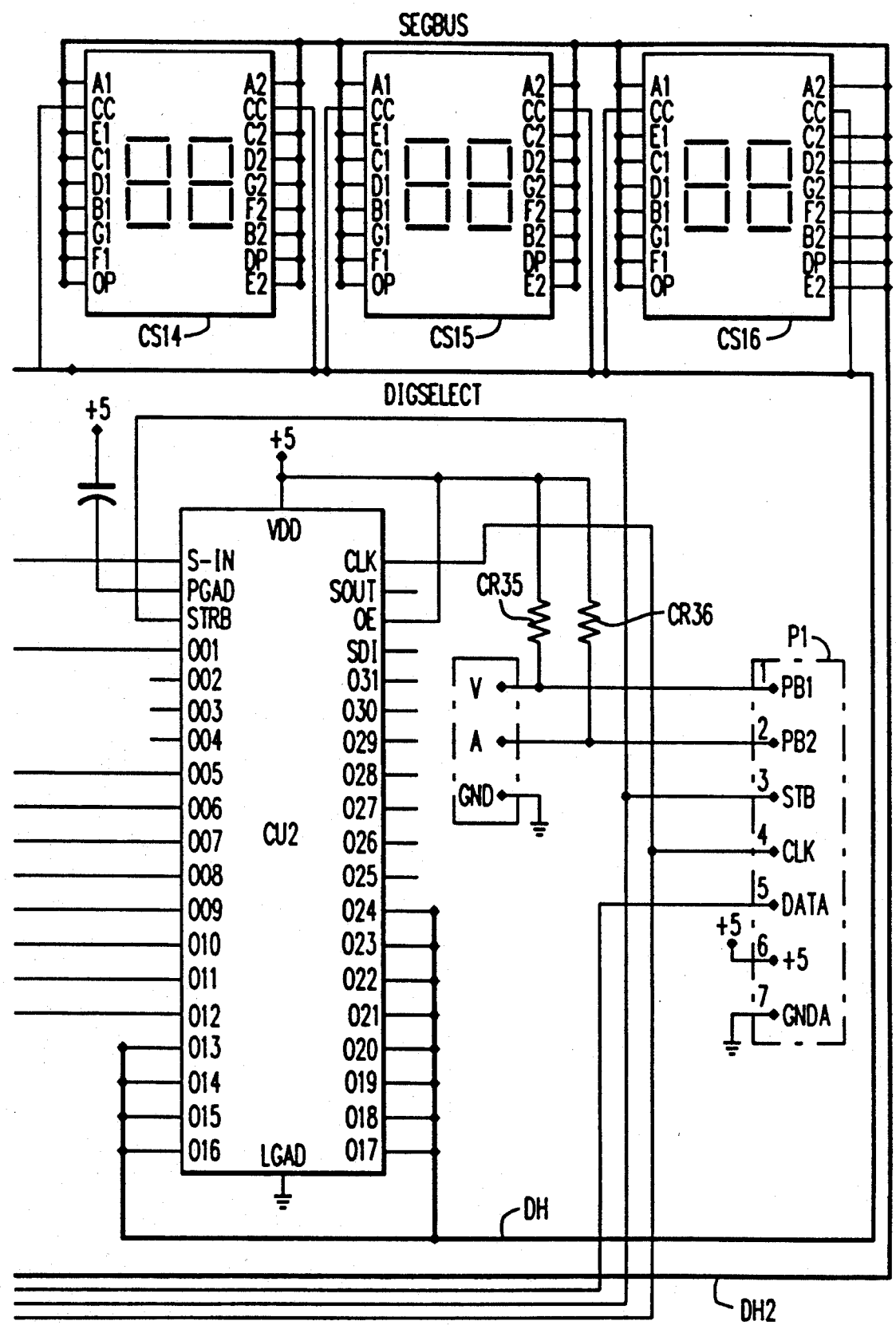

The display board represented by FIG. 6G and 6H is interconnected to the microprocessor CU5 by way of internal connector Pl which is connected to connector P7 in the following manner. Signal PB1 on connector P1 is on pin 1. Signal PB2 is on pin 2. Signal STB on pin 3. Signal CLK on pin 4. Signal DATA on pin 5. +5 V is on pin 6 and ground is on pin 7. Signals PB1 and PB2 are connected by way of resistive elements CR35 and CR36, respectively, to the +5 V power supply.

There is a 32 pin output seeking device CU2. It consists of a 32 bit shift register with latches. Device CU2 has the VDD terminal thereof connected to the 5V power supply. The CLK terminal thereof is connected to the CLK terminal of connector Pl at pin 1. The "OE"

terminal thereof is connected to the +5 V power supply. The "013" through "024" terminals thereof are connected to data highway DH. The STRB terminal is connected to the STB signal on pin 3 of connector P1. The "005" through "010" terminals of the device CU2 are connected through the cathodes of light emitting diodes CDS6 through CDS11 respectively which indicates the outputs "$V_{A\text{-}B}$", "$V_{B\text{-}C}$", "$V_{C\text{-}A}$", "$V_{A\text{-}N}$", "$V_{B\text{-}N}$", "$V_{C\text{-}N}$", respectively shown in FIG. 1 on the front panel of the monitor 10. The anodes of the aforementioned light emitting diodes CDS6 through CDS10 are connected through resistive element CR33 to the +5 V power supply. The "Q11" and "Q12" outputs of the device CU2 are connected to the cathodes of light emitting diodes CDS12 and CDS13 respectively which represents the designations "volts" and "kilovolts" as shown on the monitor 10 of FIG. 1. The anodes of the devices CDS12 and CDS13 are connected by way of resistive element CR34 to the +5 V power supply.

There is a shift register device CU3, the SD1 terminal of the device CU3 is connected to the DATA signal on pin 5 of the terminal connector P1. The SDO terminal of the device CU3 is connected to the S-IN terminal of the device CU2. The STB signal on pin 3 of connector P1 is connected concurrently to the STRB terminal of the device CU2 and the STROBE terminal of the device CU3. In a like manner the CLK terminal on pin 4 of connector P1 is connected concurrently to the CLK terminal of the device CU2 and to the CLOCK terminal of the device CU3. The VDD and VBB terminals of device CU2 are connected to the +5V power supply. The "OUT17" through "OUT20" terminals of the device CU3 and the "001" terminal of the device CU2 are connected respectively to the anodes of light emitting diodes CDS1 through CDS5 respectively which are light emitting diodes indicating the presence of values "$I_A$", "$I_B$", "$I_C$", "amps", and "kiloamps" on the front panel of the monitor 10 of FIG. 1. The cathodes of all the aforementioned light emitting diodes CDS1 through CDS5 are connected by way of resistive elements CR31 and CR32 to ground. The terminals "OUT1" through "OUT8" of device CU3 are connected by way of resistive elements CRH1 to a second data highway DH1 and the outputs "OUT9" through "OUT16" are connected by way of resistive elements CRN2 to a third data highway DH2.

There are provided six dual element scanning devices CS11 through CS16 each of which is capable of displaying independent digital numbers "0" through "9". Data highway DH is connected to the CC input terminal of each of the devices CS11 through CS16. Data highway DH1 is connected to the A1, E1, C1, D1, B1, G1, F1, OP, A2, C2, D2, G2, F2, B2, DP and E2 input terminals of each of the devices CS11 through CS13. In a like manner data highway DH2 is connected to each of the same input terminals for the display devices CS14-CS16. Data highway DH is also designated as "DIG SELECT". Data highway DH1 is designated SEG and data highway DH2 is designated "SEGBUS".

OPERATION OF THE MONITOR 10

As was described previously, the three-phase AC line voltage is brought in on conductor P3 and provided to each of the circuits CIA, CIB, and CIC for producing voltage signals VA, VB and VC which are DC signals which are supplied to input 8:1 multiplexer CU6 of FIG. 6E. The gain of the operational amplifier COA is the resistance of CR7 divided by the resistance of CR1. Generally, the voltage VA is about 51 millivolts. It will be recalled that the outputs VA, VB and VC represent ground to neutral voltage $V_{A\text{-}N}$, $V_{B\text{-}N}$, $V_{C\text{-}N}$, as shown at 22 on the front panel of FIG. 1. In that case, all the positive input terminals of the operational amplifier SCOA shown at CIA, CIB and CIC respectively which are interconnected with the 2:1 multiplexer CU1 at ZA, ZB and ZC respectively are interconnected internally by way of the multiplexer CU1 to ground as a function of the input signals SELA, SELB and SELC. On the other hand, the terminals VA, VB and VC can also be utilized to read the phase voltages $V_{A\text{-}B}$, $V_{B\text{-}C}$, $V_{C\text{-}A}$, shown at 22 on the front panel of FIG. 1 by redirecting the multiplexer CU1 to internally interconnect terminals ZA, ZB and ZC to the terminals YOB, YOC and YOA respectively. This is accomplished as a function of the direction provided to the 2:1 multiplexer CU1 by the signals SELA, SELB and SELC from the microprocessor CU5.

With respect to the electrical current input circuits shown in FIG. 6B, voltage output signals IA, IB and IC are provided which are indicative of currents at the pins 1-2, 3-4, and 5-6 respectively of the connector P5. The signals IA, IB and IC are indicative of the electrical currents $I_A$, $I_B$ and $I_C$ at region 20 of FIG. 1 on the front panel of monitor 10.

Refer now to FIGS. 6D through 6H. Microprocessor CU5 in a preferred embodiment of the invention is a Texas Instrument microcontroller TMS370. Generally information concerning voltage and currents comes into the 8:1 multiplexer CU6, as was described previously, the switching mode of which is controlled by the signals on the input terminals A, B, and C thereof. These latter signals in turn come from the microprocessor CU5. The signals which are impressed upon the input terminals of the microprocessor CU5 are chosen and serially routed out by way of the COM terminal and routed to the positive input terminal of the operational amplifier CU9. Operational amplifier CU9 is merely a voltage follower which means whatever voltage is on the position input terminal will duplicated on output terminal thereof. Operational amplifier CU9 provides high input impedance for the operational amplifiers which follow thereafter in series. Operation amplifier U9A is a times 4 gain operational amplifier. It is in a non-inverting configuration. The gain of that particular amplifier is one, plus the sum of the value of the resistance of the resistive elements CR69 through CR71 all divided by the resistance of the resistive element CR72. This gives a total gain of 4. Therefore operational amplifier U9A is a 4 to 1 gain operational amplifier. The output of this operational amplifier is fed to the AN1 input of the microprocessor CU5. The output of the operational amplifier CU9 is fed by way of resistive elements CR65 and CR66 to the AN0 terminal of the microprocessor CU5. Consequently, it can be seen that the operational amplifiers provides a multiplication factor of 1 to the signal on the output terminal COM of the multiplexer CU6 whereas the operational amplifier U9A provides a multiplication factor of 4 for the latter mentioned signal if necessary. Operational amplifiers CU9 and CU9A working in conjunction with the microprocessor CU5 provide ranging capabilities for the input signals for the microprocessor CU5 at the terminals AN1 and AN2. If the signal on the output COM of the multiplexer CU6 is small, then the comparator CCOMP working through the AN2 input of the microprocessor CU5 chooses either the CU9 output or the CU9A output for providing input information to the A/D converters through terminals AN0 or AN1, respectively. Resistive element CR75 is a pullup resistor for the output of the comparator CCOMP. Resistive elements CR73 and CR74 operating in conjunction with diode CD14 act as a clamping network for the signal on the output of the comparator CCOMP. Resistive elements CR66 and CR65 operating in conjunction with diode CD12 and CD11 form a clipping circuit for the output of the amplifier CU9. As long as the signal on terminal AN1 is below 4.5 V, that signal will be read by the A/D which is internal to the microprocessor CU5. If that signal is a larger than 4.5 V, the comparator CCOMP feeding back into input terminal AN2 will provide a digital one output which will tell the microprocessor CU5 to ignore the signal on input terminal AN1 and select the signal on input terminal AN0 for reading. At that time the voltage on the input terminal AN1 will be too large to reread.

As was described before the signal VREF5 is supplied to the VCC3 input terminal of the microprocessor CU5 from the power supply of FIG. 6C. This signal does two things. It serves as a reference voltage for the A/D converter which is internal to the microprocessor CU5 and it also serves as the power supply for that A/D converter.

The FREQ signal which is supplied to the terminal T21C1 of the microprocessor CU5 is applied to a pulse width counter internal to the microprocessor CU5. On a rising edge of the signal FREQ, the counter is reset. As long as the FREQ signal remains high the internal counter will continue to run. On the falling edge of the FREQ signal, the microprocessor "captures the timer". That is the timer generates an output which can be calculated in real time as being the width of the FREQ signal. That times two is the period of the AC input voltage.

The signals SELA, SELB, and SELC are provided from the microprocessor CU5 by way of terminals B4, B5 and B6 thereof to the A, B, and C input terminals of the 2:1 multiplexer CU1 shown in FIG. 6A for control of that device in the manner described previously.

Switches CSW1 and CSW2 are field settable dip switches that can be used by the ultimate customer or user to select a number of parameters that the device in question operates on. For example, external potential transformer ratios, current transformer ratios, whether the frequency is 50 hertz or 60 hertz and whether the system is a three-wire or four-wire system can be inputted to the microprocessor CU5 by engaging selected poles of the aforementioned switches CSW1 and CSW2.

It Will be recalled that the five lines designated CLK, DATA, INT, R/W, and BUSY tie the microprocessor CU5 to the communication network 200 shown in FIG. 5. Specifically, these signals find correspondence in the following terminal of the INCOM or communication chip MU4, respectively: SERCL1C, SERDAT, INT, R/W, and BUSY. The R/W signal is an output from the microprocessor CU5 to the INCOM chip MU4. Data is clocked into or out of the microprocessor as a function of the CLOCK signal. DATA signals are provided from the INCOM chip MU4 to the microprocessor CU5 when the R/W signal is high and from the microprocessor CU5 to the INCOM chip MU4 when R/W is low. The BUSY line provides information from the INCOM chip MU4 to the microprocessor CU5 about the status of the INCOM chip relative to the output network it deals with. The BUSY line goes active when the INCOM MU4 chip is in the process of shipping information out over the INCOM network or in this case to terminals one and two of connector P2 of FIG. 4. When the BUSY line goes low or inactive, the interrupt INT comes high. That signals that the end of a transmission and alerts the microprocessor CU5 that there has been a message received from the INCOM chip. When the interrupt line goes high the microprocessor CU5 looks at the DATA line and if there is a one on it it means that the end of a transmission has been received and there is a message waiting for the microprocessor CU5 from the INCOM chip MU4. If there is a zero on the DATA line, it means that a transmission has just been completed and the INCOM chip is available to do another transmission if necessary. The latter line can be cleared by taking the CLOCK line low and then high again while leaving the R/W line high. The interrupt line INT and the BUSY line are always outputs from the INCOM chip MU4 to the microprocessor CU5. The CLOCK line shifts bytes of data into and out of the microprocessor or INCOM chip regardless of direction. The CLOCK line is always an output from the microprocessor CU5 to the INCOM chip MU4 controlling the speed for clocking the information onto the data line.

With regard to FIGS. 6G and 6H device CU2 is a 32 pin output seeking device. It consists of a 32 bit shift register with latches. It has basically the same configuration as is shown in device CU3. Data and CLOCK information are fed into the devices CU2 and CU3 from the microprocessor CU5 in a manner described previously. The output of the device CU3 is serially tied in to the input of the device CU2 by way of the SDO line on the device CU3 and the S-IN line on the device CU2. On the presence of the devices CU2 and CU3 allows the shift in parallel of forty-four bits of information simultaneously. Consequently, the device CU2 may be thought of as being an expander for the device CU3. In essence the combination of the device CU2 and CU3 acting together form a 44 bit shift register. The strobe signal STB latches all the information on the 44 bit shift register, freeing up the shift register for the next message. The device CU2 is a sinking device. That is all the outputs are open collector, whereas device CU3 is a sourcing device that is a device capable of generating a sinking current to ground. The two devices work together to set up two scan banks CS11 through CS16. The output of these devices scan one digit at a time. Readout devices CS11 and CS12 make up the "Voltage" display of FIG. 1. The devices CS13 and CS14 make up the "current" display of FIG. 1. The devices CS15 and CS16 do not find use in the present embodiment of the invention. However, they are utilized to display frequency in other embodiments.

CALIBRATION

Figure 7:
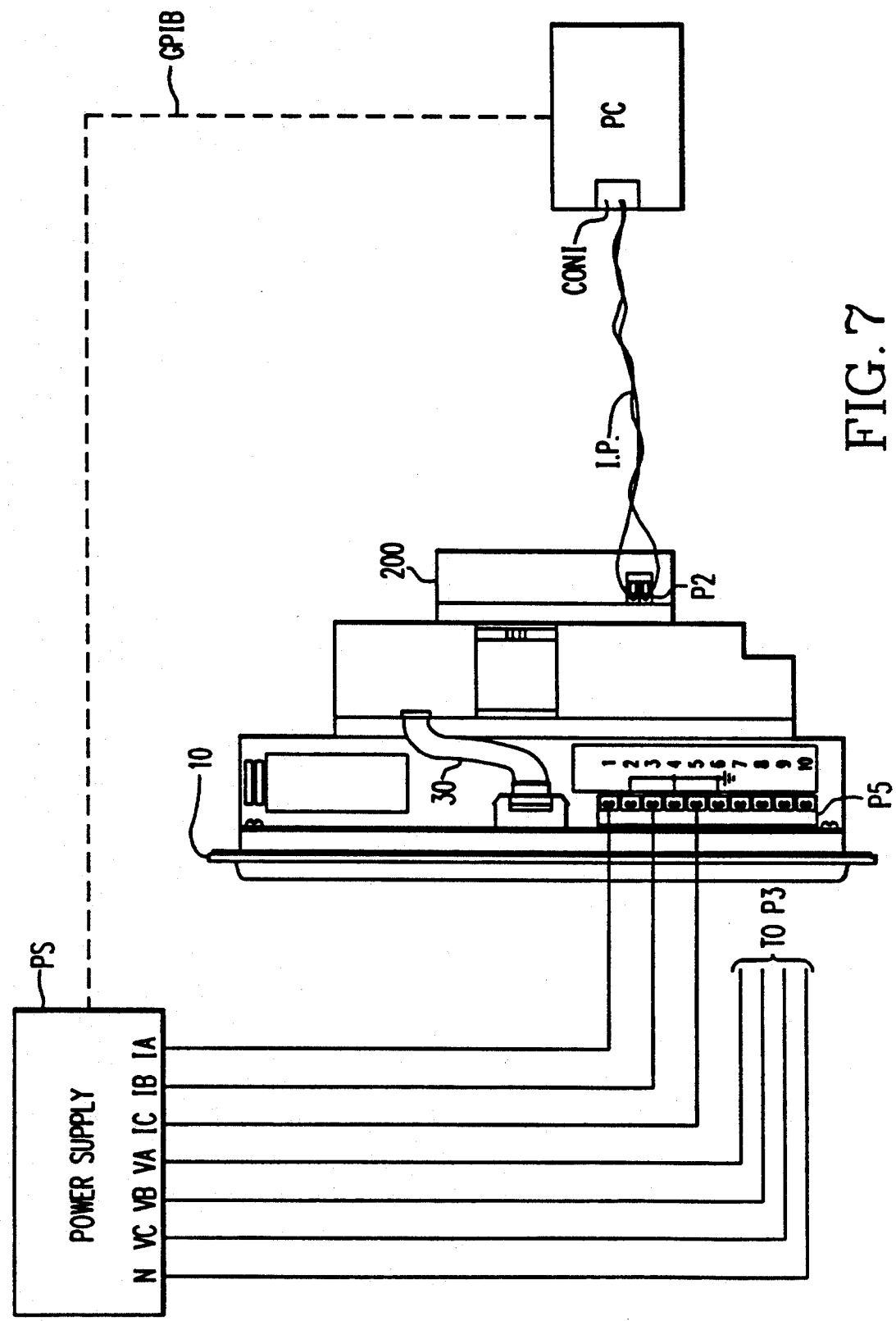
FIG. 7 shows a calibration setup which utilizes the concepts of the present invention including the apparatus depicted in FIGS. 1-6.

Referring now to FIG. 7 a calibration interconnection scheme for the monitor 10 including a precision power supply PS, and a personal computer PC is shown. In particular, the power supply PS is programmed to provide precise, accurate values of currents IA, IB and IC to terminal board P5 of monitor 10 whereas power supply PS provides precise or accurate values of voltage VA, VB, VC and neutral to terminal board P3 (shown in FIG. 3) on monitor 10. .A twisted pair of wires designated TP may be interconnected between a the personal computer PC and the communication module or PONI 200 shown in FIG. 4 at terminal board P2. The personal computer PC may employ an electrical device known as a CONI. Furthermore, an electrical cable GPIB carrying information about the value of currents and voltages generated by the power supply PS or commands from the personal computer PC may be interconnected between the power supply PS and the personal computer PC.

Figure 8:
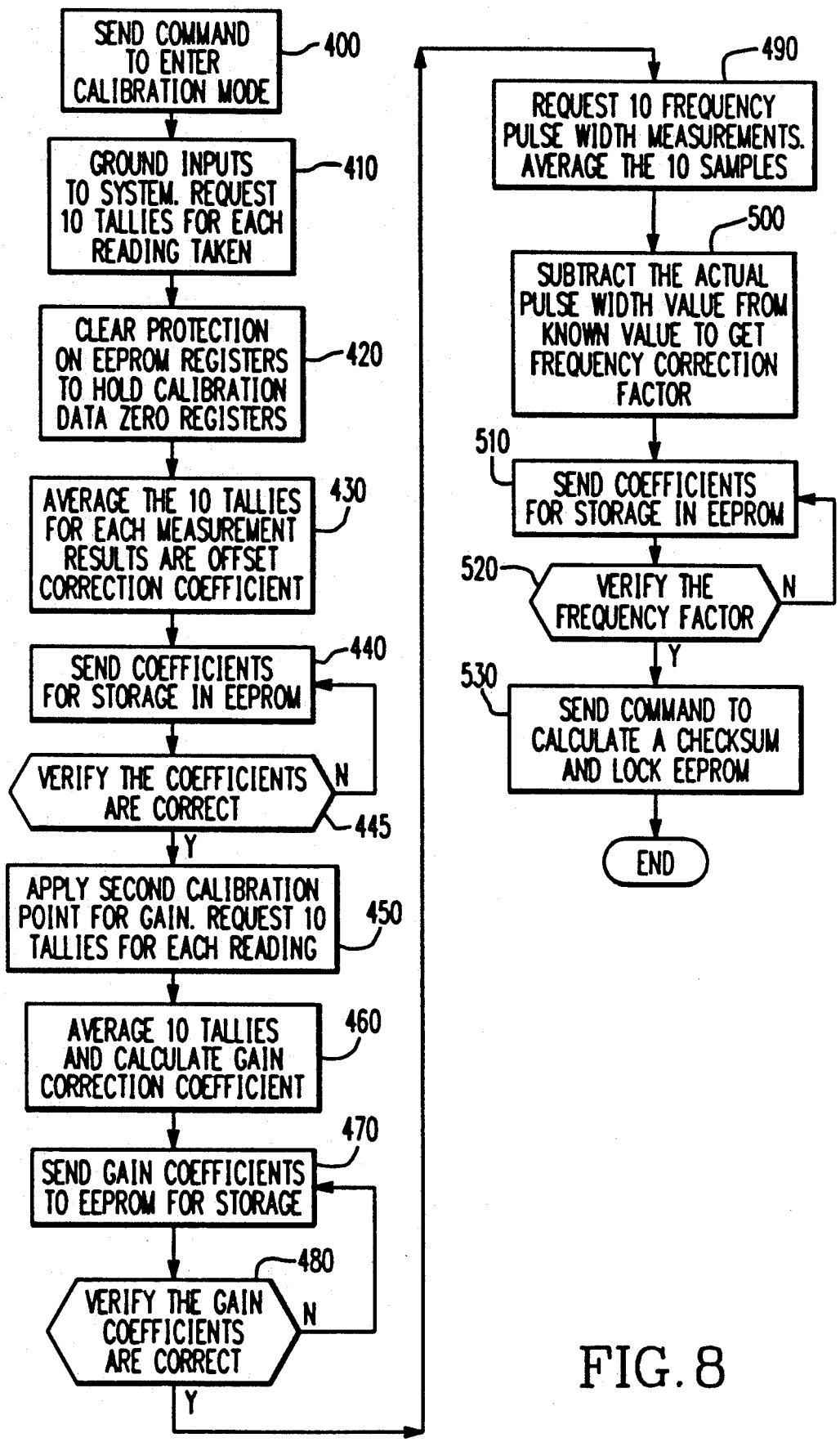
FIG. 8 a flow chart for implementing a calibration procedure suitable for use with the apparatus and setup of FIG. 7.

Referring now to FIGS. 7 and 8, a procedure for calibrating the module 10 is described According to functional block 400 in FIG. 8, the personal computer PC sends a command signal across the twisted pair of wires TP to the monitor 10 by way of the communication module 200 to cause the microprocessor CU5 of the device 10 to enter a calibration mode A GATEWAY is thereby provided to the microprocessor CU5 to allow reception of the commands that are used for calibration. Expanded test commands are sent to the microprocessor CU5 thus causing the microprocessor CU5 to go into the calibration mode. This information is fed through the module 200 through the INCOM or communication device MU4 then to the microprocessor CU5.

Block 410 requires the personal computer PC to send a command to the power supply PS to ground the current and voltage outputs VA, VB, VC, IA, IB and IC, thereof and requests ten tallies of each of the derived values thereof sent to the personal computer PC via the INCOM system 200 as described previously. Even though the current and voltage values in the microprocessor memory should be zero, they may not be because of the presence of "offset" caused by components of the intervening system.

Block 420 requires the EEPROM registers be cleared and causes a placement of zeros in each of the calibration locations therein In accordance with functional block 430, the personal computer then averages the ten tallies for each measurement. The average of the ten samples for each of the nine parameters, i.e., $V_{A-B}$, $V_{B-C}$, $V_{C-B}$, $V_{A-N}$, $V_{B-N}$, $V_{C-N}$, $I_A$, $I_B$, and $I_C$ is the offset coefficient which is to be subsequently subtracted from every tally made from that point, one by the microprocessor CU5.

Figure 9:
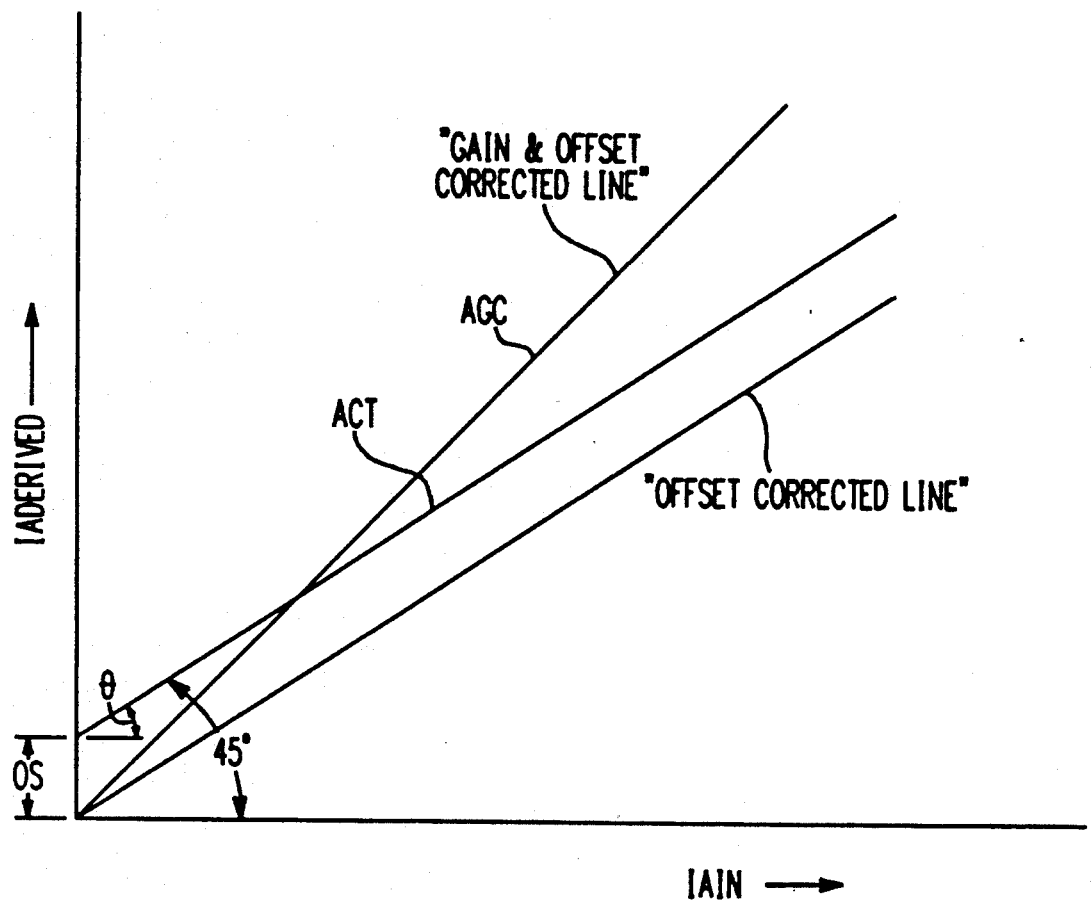

Referring at this time to FIG. 9, the relationship of a first variable which may be any one of the nine variables but for purposes of illustration as designated IAIN for the current in phase A (IA) versus the derived value IA derived is shown. The actual relationship is shown by the curve ACT or straight line. The offset OS may be due to the presence of operational amplifiers and the like in the circuits of FIGS. 6, for example. The slope of the curve AGC represents an ideal situation, that is IAIN equal IA derived for every point. Therefore the ideal representation between IAIN and IA derived should be as shown by the curve AGC which has no offset and which is at an angle 45° to the IAIN axis In this embodiment of the invention, the offset OS is removed for subsequent monitoring operation subsequent operation of the microprocessor CU5 in accordance with the step initiated at the functional block 430. The corrected line is shown. It has no offset although in this embodiment, no gain correction is made.

In accordance with functional block 440, the aforementioned offset coefficients are sent from the personal computer PC to the EEPROM by way of the communication INCOM network 200 as described previously and are permanently stored in the EEPROM.

Functional block 445 interrogates to determine if the offset coefficients are now in the EEPROM correct. If the answer is no (N), the step of functional block 440 is repeated. If the answer is yes (Y) then further action is taken. Consequently, block 445 reads and verifies the offset coefficients.

In accordance with block 450 a second calibration point may be calculated in each case in order to calibrate gain. In one embodiment of the invention, the power supply PS may be adjusted to supply any value of voltage or current but in this embodiment of the invention in response to a command from the personal computer via the GPIB cable, it provides a relatively highly accurate 120 V line-to-neutral, 5 ampere, 60 hertz current per phase to the monitor 10 and by way of the GPIB line advises the personal computer PC of this. Also in accordance with block 450 a request is made for the provision of ten tallies for each reading for the purpose of providing an average accurate reading.

In accordance with functional block 460, the ten tallies are averaged to arrive at an actual tally which is utilized to calculate the gain correction coefficient. Gain coefficient is calculated as follows: The gain coefficient is equal to the tally known, i.e., the values sent by the power supply to the personal computer PC divided by the actual tally as received from the microprocessor CU5. In this step a further manipulation may be utilized in order to solve digital "housekeeping" problems as will be described hereinafter.

According to functional blocks 470 and 480, the steps of functional blocks 440 and 445 are repeated for the gain coefficients as opposed to the offset coefficients.

In accordance with functional block 490, ten frequency pulse width measurements are determined by the microprocessor CU5 as a function of the FREQ signal and the ten samples are sent to the personal computer PC and averaged in a manner described previously with respect to offset and gain coefficients at functional blocks 430 and 460, for example.

According to functional block 500 the frequency correction factor is determined by subtracting the actual value of the pulse width from the known value as calculated by information supplied to the personal computer PC from the power supply PS along cable GPIB.

Once again in accordance with functional blocks 510 and 520 storage and verification of the frequency factor are accomplished in the same manner as was described with respect to offset and gain with respect to functional blocks 440, 445 and 470, 480 respectively.

Finally in accordance with block 530, a command is sent to calculate a check sum and to lock the EEPROM This command is used to calculate check sums and then to lock the EEPROM to prevent inadvertent removal of the calibration factors thereof.

Each tally obtained during the calibration process must have the offset correction coefficient added thereto and then the gain correction coefficient must be multiplied by the tally and then divided by the number 32768. The number 32768 is used to maintain significant figures and to adjust for the step of functional blocks 430, 460, and 490. The ultimate frequency is obtained by subtracting the frequency correction factor from the actual frequency value.

The aforementioned steps with respect to FIG. 8 may be described in still another way. Specifically in functional block 410, the personal computer PC which may be an IBM personal computer sends a message over the IEEE 488 bus or GPI Bus as the case may be to the power supply PS and tells the power supply to turn all the voltages and all the currents to zero value. At that point there inputs to the monitor 10 at connectors PC3 and PC5. Therefore, if the line ACT in FIG. 9 is of the form Y=MX+B, which X is the current IAAN, Y is the current IA derived, M is the gain $\theta$ and B is the offset OS. The offset calculation is utilized to cause the offset OS to be changed to zero by calculating what the offset is and subtracting it from every value for current voltage or frequency as the case may be to make the offset zero and to make the first point on the plot AGC equal to (0, 0). The personal computer PC is then requested to send back ten tallies. There are in fact 256 individual readings supplied by the microprocessor CU5 at 1.406 apart, (256 X 1.406°-360°) Each one of these 256 represents a tally. A final tally is generated by summing the ten tallies and dividing by ten. The final tally is the number that calibration procedure is performed on. The calibration procedures actually takes place in the personal computer PC. The personal computer PC takes the tallies averages them, divides the sum by the number of tallies which in this case is ten sends the average value back to monitor 10 by way of the microprocessor CU5 and permanently stores that value into the EEPROM. This value will now be used subsequently every time to provide an offset calculation when data is taken. The offset calculation is a subtraction operation In this particular embodiment of the invention, there are 256 bytes of EEPROM inside the microprocessor CU5. These must be zeroed initials Functional block 420 performs that function Once the information in the 256 bytes of EEPROM is locked into place, it can only be unlocked by applying a 12 V power supply signal to a portion of microprocessor CU5 and then clearing the particular register Note that in the particular embodiment of the invention previously described, there is not a 12 V power supply value present so the EEPROM cannot be accidentally cleared except by driving a 12 V signal from an external 12 V DC power supply. In step 430 the personal computer has received ten tallies from the monitor. It takes the ten tallies each from the voltage and current signals so that there are nine values with ten, i.e. a sum of 90 values tallies each. Each of those ten tallies in the nine values are averaged. At this particular time the average for each of those nine values is the offset which will be used from thence on by the microprocessor CU5. The offsets that are determined and stored within the EEPROM, will be utilized each time in a subtraction made from the appropriate one of the nine values being sampled. The offsets are sent back to the microprocessor and stored as is explained in functional block 440. The verification is done in the personal computer PC. In block 445, the nine values which have been stored in the EEPROM are then sent back to the personal computer PC by way of the monitor 200 and they are examined by the computer PC and compared with that which was sent to the microprocessor CU5 previously. If the values are equal, that part of the process is completed. In functional block 450 the personal computer PC sends a command over the GPIB bus to the power supply PS indicating that the voltage is to be 120 V AC, the amperage is to be 5 amperes, and the frequency is to be 60 hertz. The personal computer then sends a command to the IQ DATA or monitor 10 to send ten more tallies of each of the same readings as before but at the voltage values of 120 V and the current values of 5 amps. This set point calculation will be purely for determining a gain coefficient of calibration. Offset calculation is always done first and then gain calculation. After the ten tallies have been received back for each of the nine values, the gain calculation is completed. In actuality, in step 460, the gain calculation is equal to the known tally divided by the actual tally all times 32768. The reason for this is as follows. There is a 16 bit gain correction. Gain will never be off by more than a factor of two. The most significant bit in the 16 bit array is one. The resulting gain calculation figure is going to be a number that is slightly less than one or slightly greater than one but certainly less than two. The multiplication of the known tally divided by the actual tally by 32768 will indicate that the most significant bit will be one. As before in accordance with functional blocks 470 and 480, the gain coefficients are sent back for programming into the EEPROM. They are then verified and if they are not correct the whole process is repeated. Functional block 490 deals with the measurement of frequency. Ten frequency pulse width measurements are provided and averaged inside the personal computer PC. The actual value should be 60 hertz. The actual value is then subtracted from the known value inside the personal computer PC and result is the correction factor. That value is then stored in the E PROM and verified according to steps 510 and 520 in a similar manner as described previously. At appropriate calculations times that value is algebraically added to the calculations for frequency inside the microprocessor CU5 to provide frequency correction.

The EEPROM memory may have correction factors stored therein according to Table I.

It is to be understood that with respect to the embodiments of this invention, that it is not limited for use purely in a monitor but may be utilized in other kinds of electrical devices such as, but not limited to, circuit breakers and motor control devices. It is also to be understood that the input electrical variable may be but is not limited to electrical current, either phase or line voltage, electrical frequency, electrical power or the input may be a signal related to a variable such as: temperature, vibration, pressure, fluid levels, etc. It is also to be understood that the calibration factor described herein may be multiplied by the derived value or algebraic added or subtracted to the derived value.

The process and apparatus associated with the embodiments of this invention have many advantages. A main advantage lies in the fact that a calibration procedure may be implemented in which the calibration is implemented in a computer memory rather than by the adjustment of hardware devices.

I claim:

1. An electrical contactor that acts in the presence of a predetermined value of an input, electrical variable at an input thereto to perform a function, where an offset coefficient and a calibration factor are digitally stored in a memory region of said contactor and where any input electrical value within a range of input electrical values provides a corresponding derived electrical value in said contactor, comprising:

supply means for supplying a first value of said input electrical variable to said input where said first value is zero;

sensing means for sensing said supplied input electrical variable and producing a corresponding first derived value related thereto;

computing means having said first value of input electrical variable available thereto;

first communicating means for communicating said
first derived value to said computing means;

said computing means calculating an offset coefficient within said computing means according to the relationship;

said offset coefficient equals said first derived value;

second communicating means for communicating said offset coefficient to said memory region for digital placement therein;

means for using said offset coefficient by said contactor in performing said function;

said supply supplying a second value of said input electrical variable to said input;

said sensing means sensing said supplied second input electrical variable and producing a corresponding second derived value related thereto;

said first communicating means communicating said second derived value to said computing means which also has said second value of input electrical variable available thereto;

said computing means calculating a calibration factor within said computing means according to the relationship:

said calibration factor is related to said second value of input electrical variable and said second derived value;

said second communicating means communicating said calibration factor to said memory region for digital placement therein; and means for using said calibration factor by said contactor in performing said function.

2. A process for calculating an offset coefficient and a digital calibration factor for an electrical contactor that acts in the presence of a predetermined value of an input electrical variable at an input of said electrical contactor to perform a function, where said offset coefficient and said calibration factor are digitally stored in a memory region of said electrical contactor and where any input electrical value within a range of input electrical values provides a corresponding derived electrical value in said contactor, comprising the steps of:

supplying a first value of said input electrical variable to said input where said first value is zero;

sensing said supplied input electrical variable and producing in said electrical contactor a corresponding first derived value related thereto;

communicating said first derived value to a computing means;

calculating an offset coefficient within said computing means according to the relationship;

said offset coefficient equals said first derived value;

communicating said offset coefficient to said memory region for digital placement therein and subsequent use by said electrical contactor in performing said function;

supplying a second value of said input electrical variable to said input;

sensing said supplied second input electrical variable and producing in said electrical contactor a corresponding second derived value related thereto;

communicating said second derived value to said computing means which also has said second value of input electrical variable available thereto;

calculating a calibration factor within said computing means according to the relationship:

said calibration factor is related to said second value of input electrical variable and said second derived value; and communicating said calibration factor to said offset coefficient memory region for digital placement therein and subsequent use by said electrical contactor in performing said function.

3. A monitor which acts in the presence of a predetermined value of an input electrical variable at an input thereto to perform a monitoring function, where an offset coefficient and a calibration factor are digitally stored in a memory region of said monitor and where any input electrical value within a range of input electrical values provides a corresponding derived electrical value in said monitor, comprising:

supply means for supplying a first value of said input electrical variable to said input where said first value is zero;

sensing means for sensing said supplied input electrical variable and producing a corresponding first derived value related thereto;

computing means having said first value of input electrical variable available thereto;

first communicating means for communicating said first derived value to said computing means;

said computing means calculating an offset coefficient within said computing means according to the relationship;

said offset coefficient equals said first derived value;

second communicating means for communicating said offset coefficient to said memory region for digital placement therein;

means for using said offset coefficient by said monitor in performing said function;

said supply supplying a second value of said input electrical variable to said input;

said sensing means sensing said supplied second input electrical variable and producing a corresponding second derived value related thereto;

said first communicating means communicating said second derived value to said computing means which also has said second value of input electrical variable available thereto;

said computing means calculating a calibration factor within said computing means according to the relationship;

said calibration factor is related to said second value of input electrical variable and said second derived value;

said second communicating means communicating said calibration factor to said memory region for digital placement therein; and means for using said calibration factor by said monitor in performing said monitoring function.

4. A circuit breaker which acts in the presence of a predetermined value of an input electrical variable at an input thereto to perform a circuit protective function, where an offset coefficient and a calibration factor are digitally stored in a memory region of said circuit breaker and where any input electrical value within a range of input electrical values provides a corresponding derived electrical value in said circuit breaker, comprising:

supply means for supplying a first value of said input electrical variable to said input where said first value is zero;

sensing means for sensing said supplied input electrical variable and producing a corresponding first derived value related thereto;

computing means having said first value of input electrical variable available thereto;

first communicating means for communicating said
first derived value to said computing means;
said computing means calculating an offset coefficient within said computing means according to the
relationship;
said offset coefficient equals said first derived value;
second communicating means for communicating
said offset coefficient to said memory region for
digital placement therein;
means for using said offset coefficient by said circuit
breaker in performing said function;
said supply supplying a second value of said input
electrical variable to said input;
said sensing means sensing said supplied second input
electrical variable and producing a corresponding
second derived value related thereto;
said first communicating means communicating said
second derived value to said computing means
which also has second value of input electrical
variable available thereto;
said computing means calculating a calibration factor
within said computing means according to the
relationship;
said calibration factor is related to said second value
of input electrical variable and said second derived
value;
said second communicating means communicating
said calibration factor to said memory region for
digital placement therein; and
means for using said calibration factor by said circuit
breaker in performing said circuit protective function.

5. A circuit breaker which acts in the presence of a predetermined value of an input electrical variable at an input thereof to perform a circuit protective function, where an offset coefficient is digitally stored in an offset coefficient memory region of said circuit breaker and where any input electrical value within a range of input electrical values provides a corresponding derived electrical value in said circuit breaker, comprising:

supply means for supplying a first value of said input
electrical variable to said input wherein said first
value is zero;
sensing means for sensing said supplied input electrical variable and producing a corresponding first
derived value related thereto, said first derived
value being said offset coefficient;
communicating means for communicating said offset
coefficient to said offset coefficient memory region
for digital placement therein; and
means for using said offset coefficient by said circuit
breaker in performing said circuit protective function.

6. A motor controller which acts in the presence of a predetermined value of an input electrical variable at an input thereto to perform a motor control function, where an offset coefficient and a calibration factor are digitally stored in a memory region of said motor controller and where any input electrical value within a range of input electrical values provides a corresponding derived electrical value in said motor controller, comprising:

supply means for supplying a first value of said input
electrical variable to said input where said first
value is zero;
sensing means for sensing said supplied input electrical variable and producing a corresponding first
derived value related thereto;
computing means having said first value of input
electrical variable available thereto;
first communicating means for communicating said
first derived value to said computing means;
said computing means calculating an offset coefficient within said computing means according to the
relationship;
said offset coefficient equals said first derived value;
second communicating means for communicating
said offset coefficient to said memory region for
digital placement therein;
means for using said offset coefficient by said motor
controller in performing said function;
said supply supplying a second value of said input
electrical variable to said input;
said sensing means sensing said supplied second input
electrical variable and producing a corresponding
second derived value related thereto;
said first communicating means communicating said
second derived value to said computing means
which also has said second value of input electrical
variable available thereto;
said computing means calculating a calibration factor
within said computing means according to the
relationship;
said calibration factor is related to said second value
of input electrical variable and said second derived
value;
said second communicating means communicating
said calibration factor to said memory region for
digital placement therein; and
means for using said calibration factor by said motor
controller in performing said motor control function.

7. A process for calculating an offset coefficient and a digital calibration factor for a monitor that acts in the presence of a predetermined value of an input electrical variable at an input of said monitor to perform a function, where said offset coefficient and said calibration factor are digitally stored in a memory region of said monitor and where any input electrical value within a range of input electrical values provides a corresponding derived electrical value in said monitor, comprising the steps of:

supplying a first value of said input electrical variable
to said input where said first value is zero;
sensing said supplied input electrical variable and
producing in said monitor a corresponding first
derived value related thereto;
communicating said first derived value to a computing means;
calculating an offset coefficient within said computing means according to the relationship;
said offset coefficient equals said first derived value;
communicating said offset coefficient to said memory
region for digital placement therein and subsequent
use by said monitor in performing said function;
supplying a second value of said input electrical variable to said input;
sensing said supplied second input electrical variable
and producing in said monitor a corresponding
second derived value related thereto;
communicating said second derived value to said
computing means which also has said second value
of input electrical variable available thereto;
calculating a calibration factor within said computing
means according to the relationship;

said calibration factor is related to said second value of input electrical variable and said second derived value; and communicating said calibration factor to said offset coefficient memory region for digital placement therein and subsequent use by said monitor in performing said function.

8. A process for calculating an offset coefficient and a digital calibration factor for a circuit breaker that acts in the presence of a predetermined value of an input electrical variable at an input of said circuit breaker to perform a function, where said offset coefficient and said calibration factor are digitally stored in a memory region of said circuit breaker and where any input electrical value within a range of input electrical values provides a corresponding derived electrical value in said circuit breaker, comprising the steps of:

supplying a first value of said input electrical variable to said input where said first value is zero;

sensing said supplied input electrical variable and producing in said circuit breaker a corresponding first derived value related thereto;

communicating said first derived value to a computing means;

calculating an offset coefficient within said computing means according to the relationship:

said offset coefficient equals said first derived value;

communicating said offset coefficient to said memory region for digital placement therein and subsequent use by said circuit breaker in performing said function;

supplying a second value of said input electrical variable to said input;

sensing said supplied second input electrical variable and producing in said circuit breaker a corresponding second derived value related thereto;

communicating said second derived value to said computing means which also has said second value of input electrical variable available thereto;

calculating a calibration factor within said computing means according to the relationship;

said calibration factor is related to said second value of input electrical variable and said second derived value; and communicating said calibration factor to said offset coefficient memory region for digital placement therein and subsequent use by said circuit breaker in performing said function.

9. A process for calculating an offset coefficient and a digital calibration factor for a motor controller that acts in the presence of a predetermined value of an input electrical variable at an input of said motor controller to perform a function, where said offset coefficient and said calibration factor are digitally stored in a memory region of said motor controller and where any input electrical value within a range of input electrical values provides a corresponding derived electrical value in said motor controller, comprising the steps of:

supplying a first value of said input electrical variable to said input where said first value is zero;

sensing said supplied input electrical variable and producing in said motor controller a corresponding first derived value related thereto;

communicating said first derived value to a computing means;

calculating an offset coefficient within said computing means according to the relationship;

said offset coefficient equals said first derived value;

communicating said offset coefficient to said memory region for digital placement therein and subsequent use by said motor controller in performing said function;

supplying a second value of said input electrical variable to said input;

sensing said supplied second input electrical variable and producing in said motor controller a corresponding second derived value related thereto;

communicating said second derived value to said computing means which also has said second value of input electrical variable available thereto;

calculating a calibration factor within said computing means according to the relationship;

said calibration factor is related to said second value of said input electrical variable and said second derived value; and communicating said calibration factor to said offset coefficient memory region for digital placement therein and subsequent use by said motor controller in performing said function.

* * * * *